United States Patent
Yoshimi et al.

(10) Patent No.: US 7,831,715 B2
(45) Date of Patent: Nov. 9, 2010

(54) COMMUNICATION SYSTEM, COMMUNICATION METHOD, AND PROGRAM

(75) Inventors: Hideo Yoshimi, Tokyo (JP); Nobuyuki Enomoto, Tokyo (JP); Zhenlong Cui, Tokyo (JP); Kazuo Takagi, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 460 days.

(21) Appl. No.: 11/766,170

(22) Filed: Jun. 21, 2007

(65) Prior Publication Data

US 2008/0008170 A1    Jan. 10, 2008

(30) Foreign Application Priority Data

Jun. 21, 2006  (JP) ............................. 2006-171720
Jun. 15, 2007  (JP) ............................. 2007-158380

(51) Int. Cl.
*G06F 15/16* (2006.01)

(52) U.S. Cl. .................. 709/227; 709/203; 709/229; 709/236; 709/206; 370/352; 370/396; 370/338; 370/230; 370/310

(58) Field of Classification Search ................. 709/203, 709/227, 229, 236, 206; 370/352, 396, 338, 370/230, 310
See application file for complete search history.

(56) References Cited

U.S. PATENT DOCUMENTS

| 2004/0001480 A1* | 1/2004 | Tanigawa et al. ............ 370/352 |
| 2004/0202117 A1* | 10/2004 | Wilson et al. ................ 370/310 |
| 2005/0141522 A1* | 6/2005 | Kadar et al. ................. 370/396 |
| 2007/0019545 A1* | 1/2007 | Alt et al. ..................... 370/230 |

FOREIGN PATENT DOCUMENTS

| JP | 2002368826 A | 12/2002 |
| JP | 2004248165 A | 9/2004 |
| JP | 2005-316529 A | 11/2005 |

* cited by examiner

*Primary Examiner*—Wing F Chan
*Assistant Examiner*—Benjamin M Thieu
(74) *Attorney, Agent, or Firm*—Sughrue Mion, PLLC

(57) ABSTRACT

An object of the present application is to provide a technology that can achieve packet communication between terminals connected to the Internet by way of a relay server in a faster and safer manner. The system of present application is a communication system characterized in that, on receipt of a start-connection message, a relay server having the lowest load is searched, and communication is achieved by way of the relay server found.

30 Claims, 34 Drawing Sheets

FIG. 7

| ID NO. | SESSION A | SESSION B | | | |
|---|---|---|---|---|---|
| A1 | TERMINAL 21 | TERMINAL 27 | | | |
| A2 | TERMINAL XX | TERMINAL YY | | | |
| A3 | | | | | |
| 1 | | | | | |
| 2 | | | | | |
| 3 | | | | | |
| .. | | | | | |
| .. | | | | | |
| 100 | | | | | |

FIG. 9

| SERVER NO. | | # OF CURRENT RELAYED-TRANSFERS | ID'S UNUSED |
|---|---|---|---|
| 1 | RELAY SERVER 24A | 1 | A4 – A100 |
| 2 | RELAY SERVER 24B | 2 | B3 – B100 |
| 3 | RELAY SERVER 24C | 3 | C3 – C100 |
| ... | | | |
| ... | | | |
| 100 | | | |

FIG. 18

| | ID/PASSWORD | START-CONNECTION MESSAGE |
|---|---|---|
| 1 | XXX/YYY | IP ADDRESS OF RELAY SERVER 24A, PORT NO. OF RELAY SERVER 24A, AND ID NO. (A1) |
| 2 | | |
| 3 | | |
| ... | | |
| ... | | |
| 100 | | |

FIG. 30

| | SERVER NO. | # OF CURRENT RELAYED-TRANSFERS | ID'S USED | ID'S UNUSED |
|---|---|---|---|---|
| 1 | RELAY SERVER 24A | 1 | A1 – A3 | A4 – A100 |
| 2 | RELAY SERVER 24B | 2 | B1 – B3 | B4 – B100 |
| 3 | RELAY SERVER 24C | 3 | C1 – C2 | C3 – C100 |
| " " | | | | |
| " " | | | | |
| 100 | | | | |

FIG. 31

| | SENDER TERMINAL | TRANSFER DESTINATION RELAY SERVER | ID |
|---|---|---|---|
| 1 | TERMINAL 21 | RELAY SERVER 24A | A1 |
| 2 | TERMINAL 27 | RELAY SERVER 24A | A1 |
| 3 | | | |
| ... | | | |
| ... | | | |
| 100 | | | |

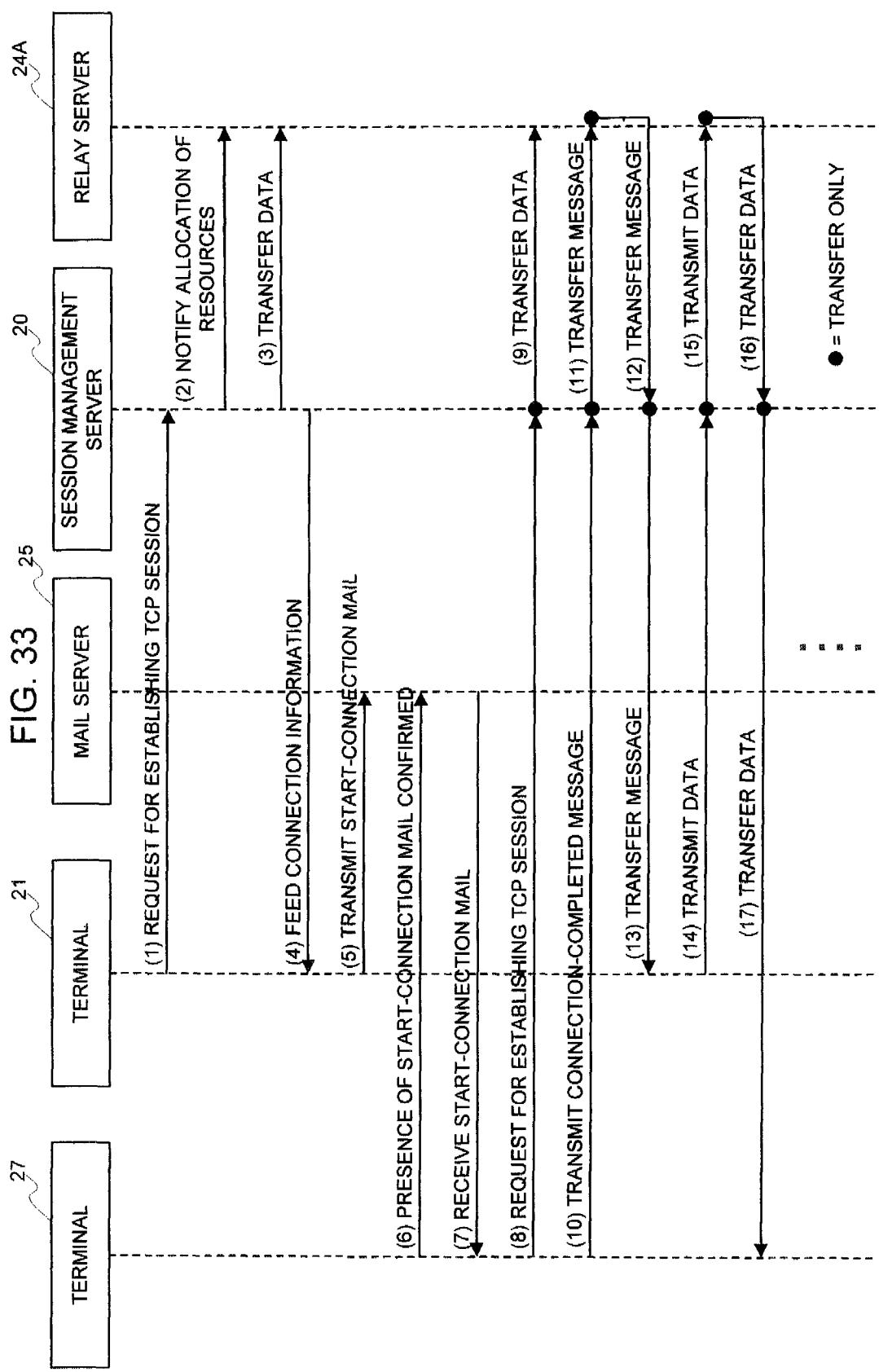

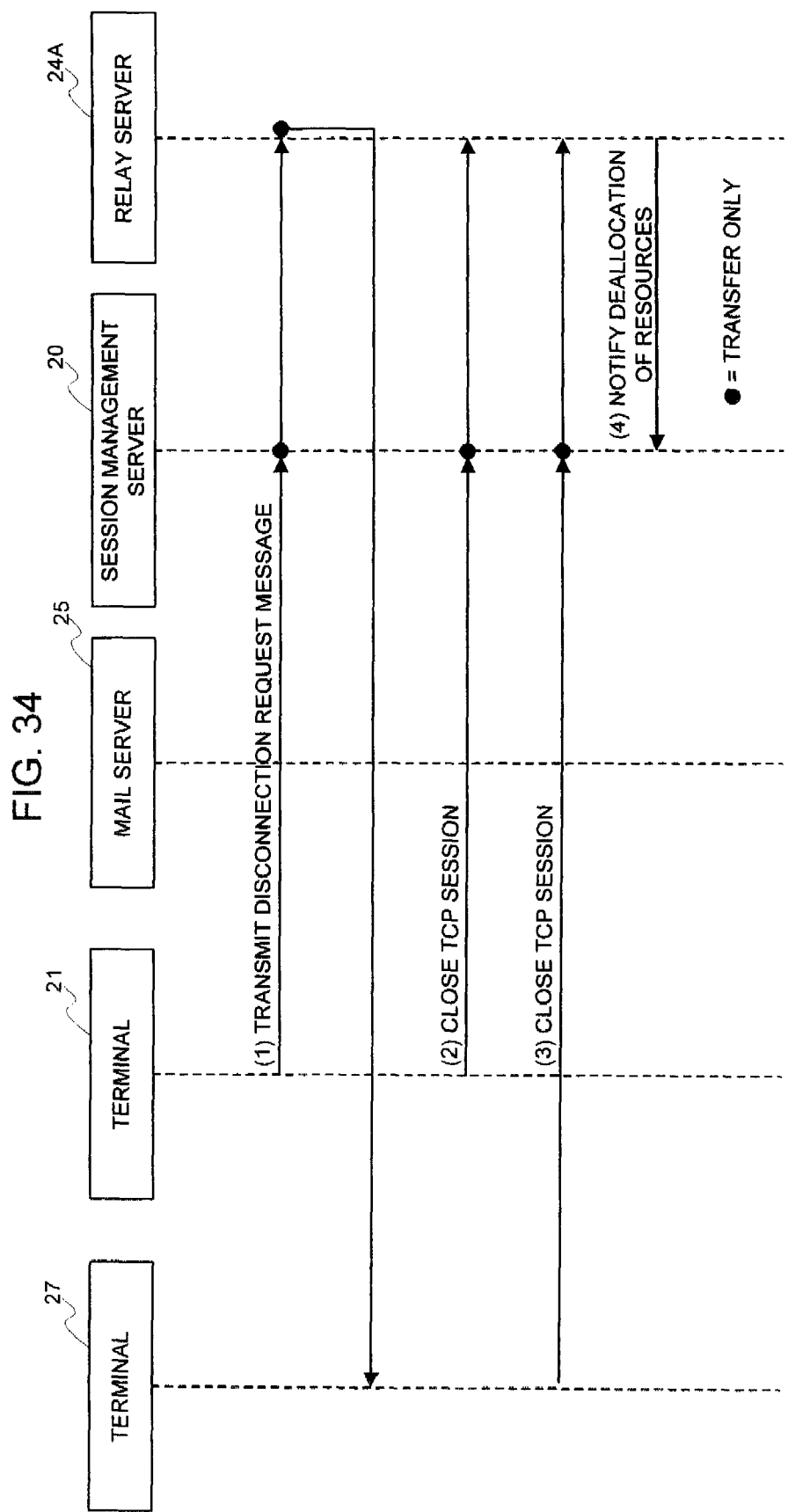

COMMUNICATION SYSTEM, COMMUNICATION METHOD, AND PROGRAM

INCORPORATION BY REFERENCE

This application claims the priority based on Japanese Patent Application No. 2006-171720 filed on Jun. 21, 2006 and Japanese Patent Application No. 2007-158380 filed on Jun. 15, 2007, disclosure of which is incorporated herein in its entirety by reference.

TECHNICAL FIELD

The present application relates to communication between terminals, and particularly, to a technology that uses a relay server to thereby achieve communication between terminals that can be connected to a network.

BACKGROUND ART

The Internet controls routing of packets based on IP addresses. Specifically, a unique IP address (which is generally called a global IP address) is assigned to each of terminals connected to the Internet, whereby a destination of a packet can be identified.

However, as the Internet becomes widespread, the risk of starvation of the global IP addresses to be assigned to terminals is raised. Accordingly, generally practiced is a method involving, in a closed environment in a sole organization, using an IP address (which is generally called a private IP address) that works merely within that organization, and assigning a proper global IP address only when the Internet is to be accessed.

If a terminal having a private IP address attempts to access the Internet, processing of converting its private IP address into a global IP address is required. Mechanisms for achieving such processing have been proposed, including a technique such as a proxy or a NAT (Network Address Translator), so that each terminal can be connect to the Internet via the proxy or NAT.

In such a case, however, there arises a problem that a P2P (peer-to-peer) application such as chatting cannot be used via the Internet between terminals having private IP addresses. This is because, although a global IP address must be specified as a destination address to deliver a packet to the destination via the Internet as described above, a terminal that should serve as the destination is merely assigned with a private IP address when the NAT is installed.

To solve such a problem, a scheme for relaying/transferring packets using a relay server has been proposed in Patent Document 1.

A relay server in Patent Document 1 accepts a connection from terminals having private IP addresses such that the terminals can use a P2P application. It then receives a packet from the terminal serving as a sender, and transfers the received packet to the terminal serving as a destination. The terminals can thus exchange the packets by indirectly exchanging packets through the intermediary of the relay server even if the terminals are not assigned with global IP addresses.

FIG. 1 shows the system as disclosed in Patent Document 1, and FIG. 2 shows a procedure to establish a connection as disclosed in Patent Document 1. The connection processing will now be described with reference to FIG. 2.

When a terminal 1 desires to start communicate with a terminal 7, the terminal 1 first transmits a start-connection mail, which is destined for the terminal 7 for notifying starting of connection, to a mail server 5.

The terminal 7 periodically (e.g., every thirty seconds) checks the mail server 5 as to whether the start-connection mail has arrived.

If the start-connection mail has arrived at the mail server 5, the terminal 7 receives the start-connection mail.

On receipt of the start-connection mail, the terminal 7 establishes an HTTP (Hyper Text Transfer Protocol) connection with a relay server 4 that is connected to the Internet.

Once the terminal 7 has established the HTTP connection, it receives an authentication URL from the relay server 4 and transmits a connection-completed mail, which is destined for the terminal 1 for notifying completion of the HTTP connection, to the mail server 5. The connection-completed mail contains the authentication URL.

The terminal 1 periodically (e.g., every thirty seconds) checks the mail server 5 as to whether the connection-completed mail has arrived.

If the connection-completed mail has arrived at the mail server, the terminal 1 receives the connection-completed mail.

On receipt of the connection-completed mail, the terminal 1 establishes an HTTP connection with the relay server 4 based on the authentication URL contained in the connection-completed mail. Once the HTTP connection has been established, the terminal 1 transmits a user ID and a password to the relay server 4 for authentication processing.

After completion of the authentication processing, the relay server 4 conducts relay-transfer of packets to enable communication between the terminals 1, 7. Specifically, the relay server 4 transfers to the terminal 7 a packet transmitted from the terminal 1, and also transfers to the terminal 1 a packet transmitted from the terminal 7.

The terminals 1, 7 can thus exchange packets by indirectly exchanging the packets through the intermediary of the relay server 4 even if the terminals 1, 7 are not assigned with global IP addresses.

[Patent Document 1] Japanese Patent Application Laid Open No. 2005-316529

SUMMARY OF THE INVENTION

According to Patent Document 1, however, two electronic mails, i.e., the start-connection mail and connection-completed mail, must be exchanged between the terminals 1, 7 before packet relay processing is started at the relay server 4.

Since an electronic mail is designed to be delivered from a sender to a destination by way of a plurality of mail servers, it may often take thirty seconds or more from transmission of a mail to arrival of the mail. Moreover, if the mail server 5 on the way is in an abnormal state, the electronic mail may be discarded.

According to Patent Document 1, since an electronic mail is thus used as means for communication between the terminals 1, 7, it takes a very long time to complete preparation for packet communication, thus posing a problem in the convenience of the technique.

Moreover, according to Patent Document 1, if the number of terminals or the amount of data to be transmitted/received between the terminals increases, an enormous amount of load is put on the relay server 4 that takes charge of the relay processing for them. Thus, according to Patent Document 1, the processing load on the relay server 4 tends to be high and a long time is required in relay processing, thus posing a problem in the convenience of the technique.

Furthermore, according to Patent Document 1, a user ID and a password are transmitted without encryption when the terminal 1 attempts to connect to the relay server 4. Thus, according to Patent Document 1, such information may be intercepted by malicious third parties on the Internet, thus posing a problem of security of the technique.

In addition, according to Patent Document 1, connection processing between the terminals 1, 7 is started by a user operating the terminal 1. Since one who can start the connection processing is limited to a user who is capable of directly operating the terminal 1, a user who is not capable of directly operating the terminal 1 cannot start the connection processing. Thus, according to Patent Document 1, if connection processing is to be started, a user must go to a location where a direct operation of the terminal 1 is allowed, and it takes a long time to start connection processing via the relay server 4, posing a problem in the convenience of the technique.

The present application has been made to solve the aforementioned problems, and its exemplary object is to provide a technology that can achieve packet communication between terminals connected to the Internet by way of a relay server in a faster and safer manner.

A first invention for solving the aforementioned problems is a communication system including a relay server for establishing a session with a first terminal and with a second terminal; a start-connection message transmitter for transmitting a start-connection message carrying information on the relay server to the second terminal after the first terminal has established a session with the relay server; and a connection-completed message transmitter for transmitting a connection-completed message to the relay server after the second terminal has established a session with the relay server based on the information on the relay server, wherein the relay server transfers the connection-completed message to the first terminal, and then, relays communication between the first terminal and the second terminal.

A second invention for solving the aforementioned problems is the first invention wherein the relay server includes a relay server having a minimum processing load found in a search made by a session management server.

A third invention for solving the aforementioned problems is the first or second invention wherein the start-connection message transmitter is arranged in the first terminal.

A fourth invention for solving the aforementioned problems is the second invention wherein the start-connection message transmitter is arranged in the session management server.

A fifth invention for solving the aforementioned problems is any one of the first to fourth inventions wherein the relay server establishes the session with the first terminal connected therewith based on a command from an auxiliary terminal.

A sixth invention for solving the aforementioned problems is any one of the first to fifth inventions wherein the start-connection message transmitter transmits the start-connection message destined for the second terminal using an electronic mail via a mail server.

A seventh invention for solving the aforementioned problems is any one of the second to sixth inventions wherein the start-connection message transmitter transmits the start-connection message destined for the second terminal via the session management server.

An eighth invention for solving the aforementioned problems is any one of the second to seventh inventions wherein the relay server transfers data from the first terminal to the second terminal via the session management server, and transfers data from the second terminal to the first terminal via the session management server.

A ninth invention for solving the aforementioned problems is any one of the first to eighth inventions wherein the first terminal and the second terminal transmit and receive encrypted data.

A tenth invention for solving the aforementioned problems is the ninth invention wherein the first terminal and the second terminal execute the encryption at a transport layer or higher.

An eleventh invention for solving the aforementioned problems is any one of the first to tenth inventions wherein the first terminal transmits a disconnection request message to the second terminal using the session established between itself and the relay server and the session established between the relay server and the second terminal, to disconnect each session established with the relay server.

A twelfth invention for solving the aforementioned problems is any one of the first to eleventh inventions wherein, when the session with the first terminal is disconnected, the relay server transmits a disconnection request message to the second terminal using the session established with the second terminal.

A thirteenth invention for solving the aforementioned problems is any one of the first to twelfth inventions wherein the relay server disconnects each session established with the first terminal and the second terminal when the session established with the first terminal or the second terminal is in a communication-less state for a certain period of time.

A fourteenth invention for solving the aforementioned problems is a relay server in a communication system, including: a session establishing unit for establishing a session with a first terminal, and then, establishing a session with a second terminal; and a relay for transferring to the first terminal a connection-completed message transmitted by the second terminal after the sessions are established with the first terminal and the second terminal, and then, relaying communication between the first terminal and the second terminal.

A fifteenth invention for solving the aforementioned problems is a communication method including a first establishing step of establishing a session between a first terminal and a relay server; a start-connection message transmitting step of, after the session has been established between the first terminal and the relay server, transmitting a start-connection message carrying information on the relay server to a second terminal; a second establishing step of establishing a session between the second terminal and the relay server based on the information on the relay server; a connection-completed message transmitting step of transmitting a connection-completed message to the relay server after the second terminal has established the session with the relay server; a connection-completed message transferring step of transferring the connection-completed message to the first terminal; and a data transferring step of, after the connection-completed message has been transferred, transferring data from the first terminal to the second terminal, and transferring data from the second terminal to the first terminal.

A sixteenth invention for solving the aforementioned problems is the fifteenth invention wherein the first establishing step has a searching step of searching for a relay server having a minimum processing load to establish a session between a relay server found in the search and the first terminal.

A seventeenth invention for solving the aforementioned problems is the fifteenth or sixteenth invention wherein the first establishing step includes a step of establishing a session between the first terminal connected therewith based on a command from an auxiliary terminal, and the relay server.

An eighteenth invention for solving the aforementioned problems is any one of the fifteenth to seventeenth inventions wherein the start-connection message transmitting step includes a step of transmitting the start-connection message destined for the second terminal using an electronic mail via a mail server.

A nineteenth invention for solving the aforementioned problems is any one of the fifteenth to eighteenth inventions wherein the start-connection message transmitting step includes a step of transmitting the start-connection message destined for the second terminal via a session management server.

A twentieth invention for solving the aforementioned problems is any one of the fifteenth to nineteenth inventions wherein the data transferring step includes a step of transferring data from the first terminal to the second terminal via the session management server, and transferring data from the second terminal to the first terminal via the session management server.

A twenty-first invention for solving the aforementioned problems is any one of the fifteenth to twentieth inventions wherein the method has an encrypting step of encrypting the data.

The twenty-second invention for solving the aforementioned problems is the twenty-first invention wherein the encrypting step includes a step of encrypting the data at a transport layer or higher.

The twenty-third invention for solving the aforementioned problems is any one of the fifteenth to twenty-second inventions wherein the method has:

a disconnection-request-message transmitting step of transmitting a disconnection request message from the first terminal to the second terminal using the session established between the first terminal and the relay server and the session established between the relay server and second terminal;

a first disconnecting step of, after the disconnection request message has been transmitted, disconnecting the session established between the first terminal and the relay server; and a second disconnecting step of disconnecting the session established between the relay server and the second terminal based on the disconnection request message.

A twenty-fourth invention for solving the aforementioned problems is any one of the fifteenth to twenty-third inventions wherein the method has a disconnection-request-message transmitting step of, when the session established between the relay server and the first terminal is disconnected, transmitting the disconnection request message to the second terminal using the session established between the relay server and the second terminal.

A twenty-fifth invention for solving the aforementioned problems is any one of the fifteenth to twenty-fourth inventions wherein the method has a disconnecting step of disconnecting the session established between the relay server and the first terminal or the session established between the relay server and the second terminal when the session established between the relay server and the first terminal or between the relay server and second terminal is in a communication-less state for a certain period of time.

A twenty-sixth invention for solving the aforementioned problems is a storage medium that stores a computer-executable program, the program causing the computer to function as: a session establishing unit for establishing a session with a first terminal, and then, establishing a session with a second terminal; and a relay for transferring to the first terminal a connection-completed message transmitted by the second terminal after the sessions are established with the first terminal and the second terminal, and then, relaying communication between the first terminal and the second terminal.

A twenty-seventh invention for solving the aforementioned problems is a communication system in which terminals connected to a network communicate with each other via a relay server, including: a terminal for transmitting a start-connection message for starting communication and a transmission request of information on a relay server to be connected; and a session management server for, on receipt of the transmission request, searching for a relay server having a minimum load, wherein the terminal communicates via a relay server found in a search made by the session management server after receiving a connection-completed message in response to the start-connection message.

A twenty-eighth invention for solving the aforementioned problems is the twenty-seventh invention wherein the terminal communicates via the relay server found in the search made by the session management server and via the session management server.

A twenty-ninth invention for solving the aforementioned problems is the twenty-seventh or twenty-eighth invention wherein the session management server commands the relay server found in the search to relay and transfer data to be transmitted and received between the terminals.

A thirtieth invention for solving the aforementioned problems is any one of the twenty-seventh to twenty-ninth inventions wherein the system has an auxiliary terminal for transmitting to the terminal a command message for commanding it to transmit a start-connection message to the session management server.

A thirty-first invention for solving the aforementioned problems is a terminal that communicates via a relay server, including: a transmitting section for transmitting a start-connection message for starting communication and a transmission request of information on a relay server to be connected; and a communicating section for, after receiving a connection-completed message in response to the start-connection message, communicating via a relay server having a minimum load found in a search made by a session management server on receipt of the transmission request.

A thirty-second invention for solving the aforementioned problems is a communication method in which terminals connected to a network communicate with each other via a relay server, including: a start-connection message transmitting step of transmitting a start-connection message for starting communication; a transmission request transmitting step of transmitting a transmission request of information on a relay server to be connected; a searching step of, on receipt of the transmission request, searching for a relay server having a minimum load; a receiving step of receiving a connection-completed message in response to the start-connection message; and a communicating step of communicating via the relay server found in the search after receiving the connection-completed message.

A thirty-third invention for solving the aforementioned problems is the thirty-second invention wherein the communicating step has a communicating step of communicating via the relay server found in the search and a session management server.

A thirty-fourth invention for solving the aforementioned problems is the thirty-second or thirty-third invention wherein the method has a step of commanding the relay server found in the search to relay and transfer data to be transmitted and received between the terminals.

A thirty-fifth invention for solving the aforementioned problems is any one of the thirty-second to thirty-fourth inventions wherein the method has a step of transmitting a command message to the terminal for commanding it to transmit a start-connection message.

A thirty-sixth invention for solving the aforementioned problems is a storage medium that stores a computer-executable program, the program causing the computer to function as: a transmitting section for transmitting a start-connection message for starting communication and a transmission request of information on a relay server to be connected; and a communicating section for, after receiving a connection-completed message in response to the start-connection message, communicating via a relay server having a minimum load found in a search made by a session management server on receipt of the transmission request.

BRIEF DESCRIPTION OF THE DRAWINGS

This and other objects, features and advantages of the present application will become more apparent upon a reading of the following detailed description and drawings, in which:

FIG. 7 is a diagram for explaining a relay table;

FIG. 9 is a diagram for explaining a management table;

FIG. 18 is a diagram for explaining a memory table;

FIG. 30 is a diagram for explaining a management table;

FIG. 31 is a diagram for explaining a header conversion table;

FIG. 33 is a diagram for explaining a connecting operation in the sixth embodiment of the present application; and FIG. 34 is a diagram for explaining a disconnecting operation in the sixth embodiment of the present application.

EXEMPLARY EMBODIMENTS

Now a first embodiment of the present application will be described in detail with reference to the accompanying drawings.

First, the configuration of the present embodiment will be described.

Figure 1:
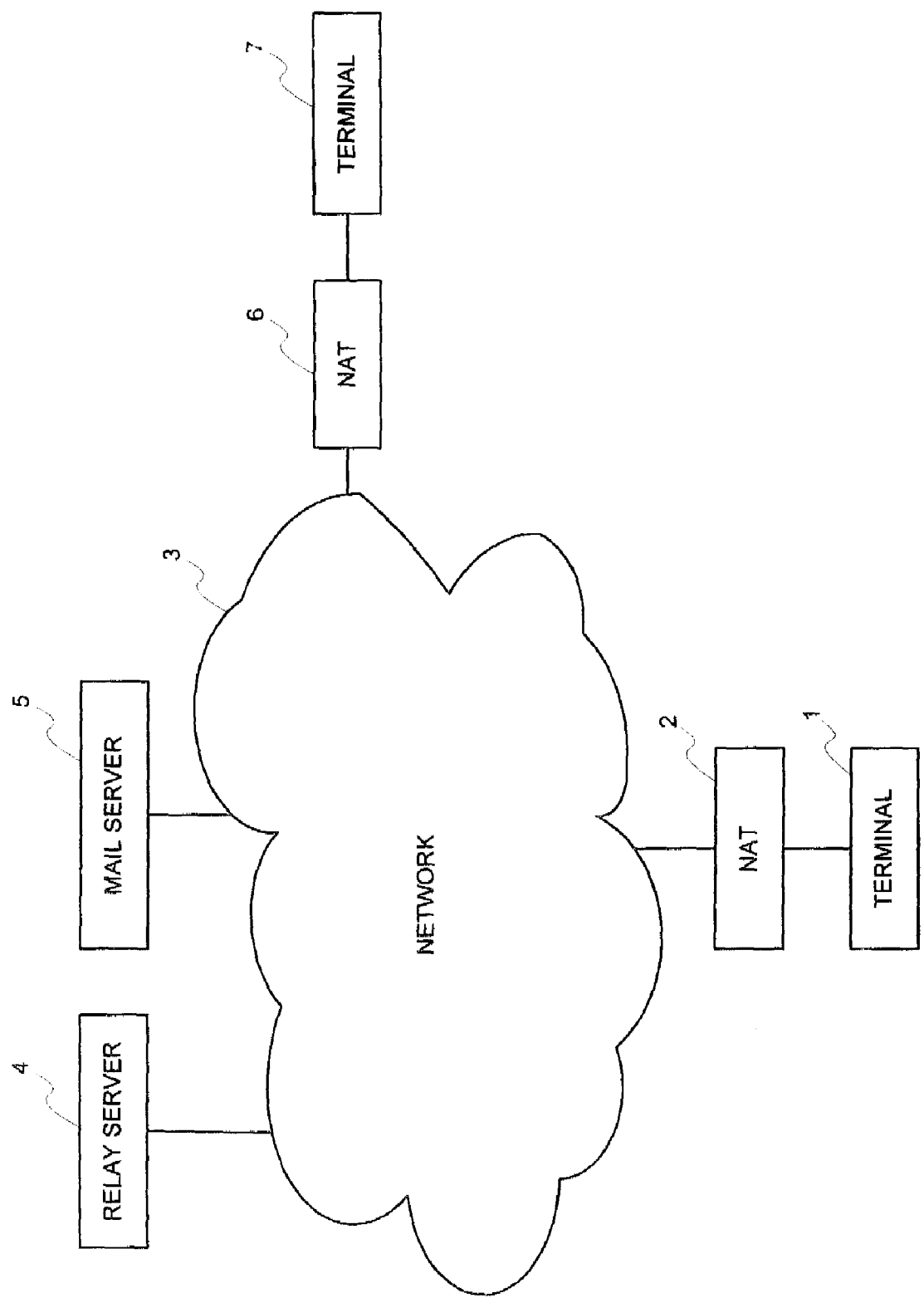
FIG. 1 is a configuration diagram of a technology related to the present application.
Figure 2:
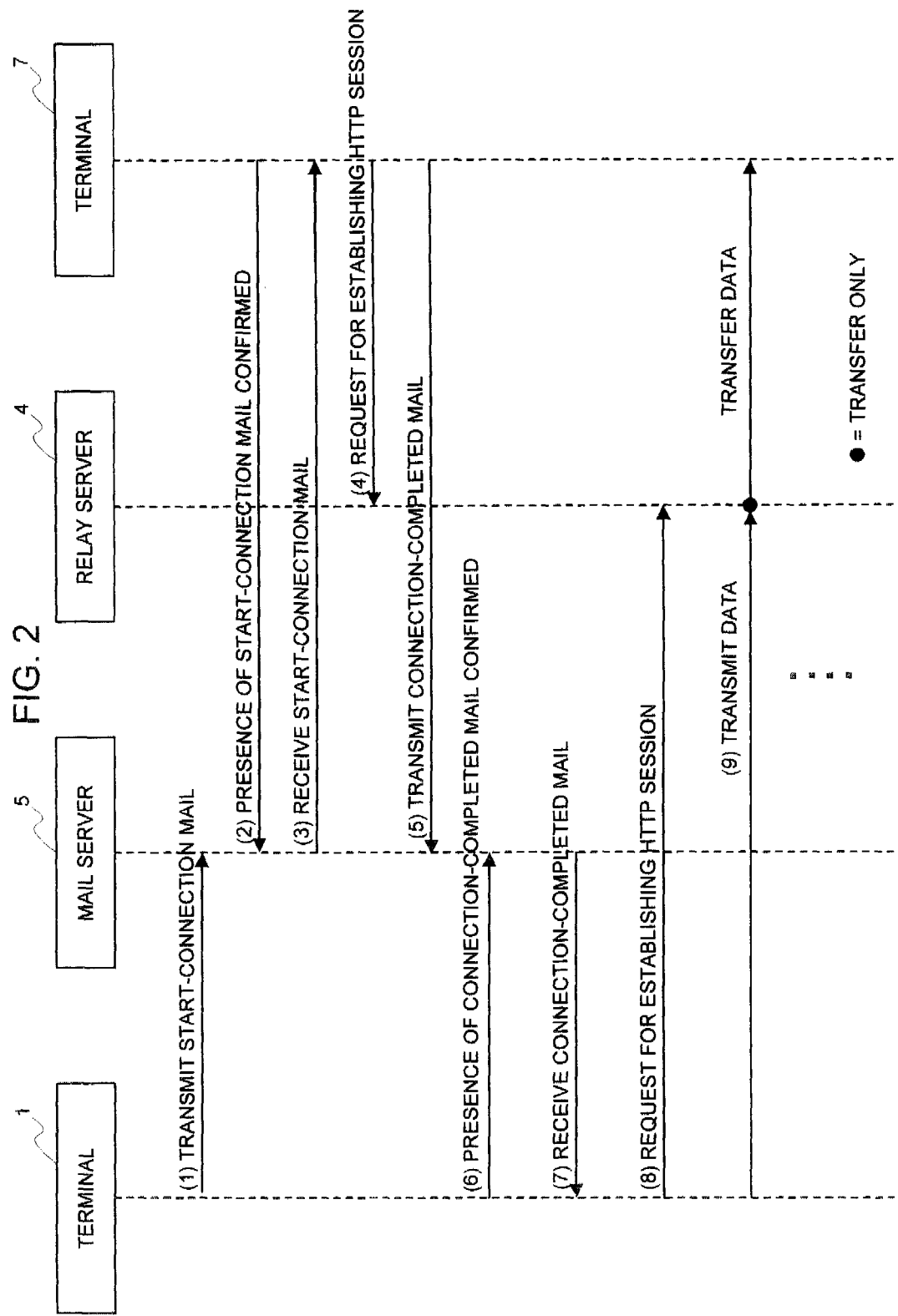
FIG. 2 is a diagram for explaining an operation of the technology related to the present application.
Figure 3:
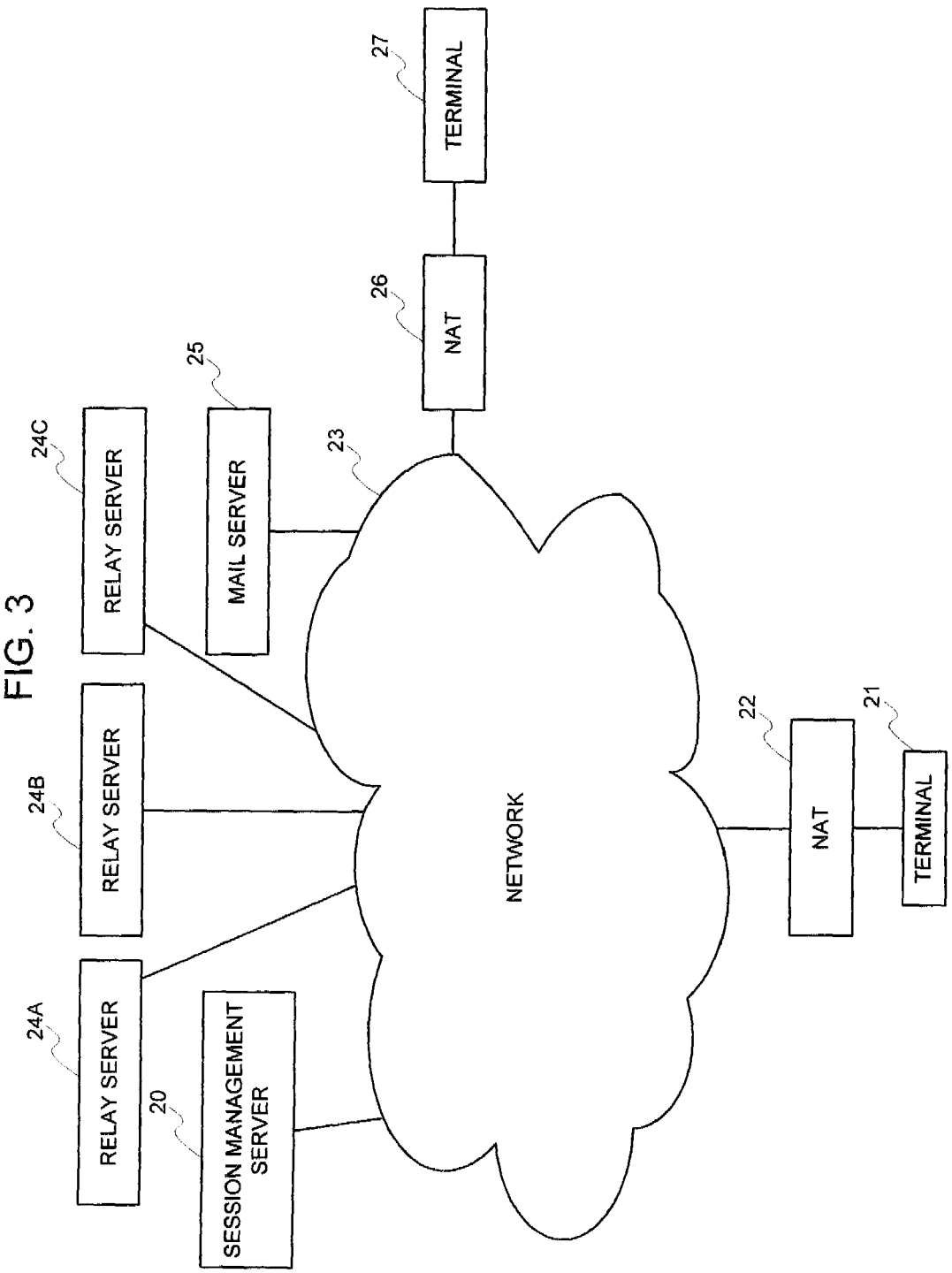
FIG. 3 is a configuration diagram of a first embodiment of the present application.

Referring to FIG. 3, the first embodiment of the present application has a terminal 21 being operated by a user, a network 23 represented by the Internet, NAT 22 and NAT 26 for address transformation, a terminal 27 remote from a terminal 21, a session management server 20 connected to the network 23, relay servers 24A-24C, and a mail server 25.

Figure 4:
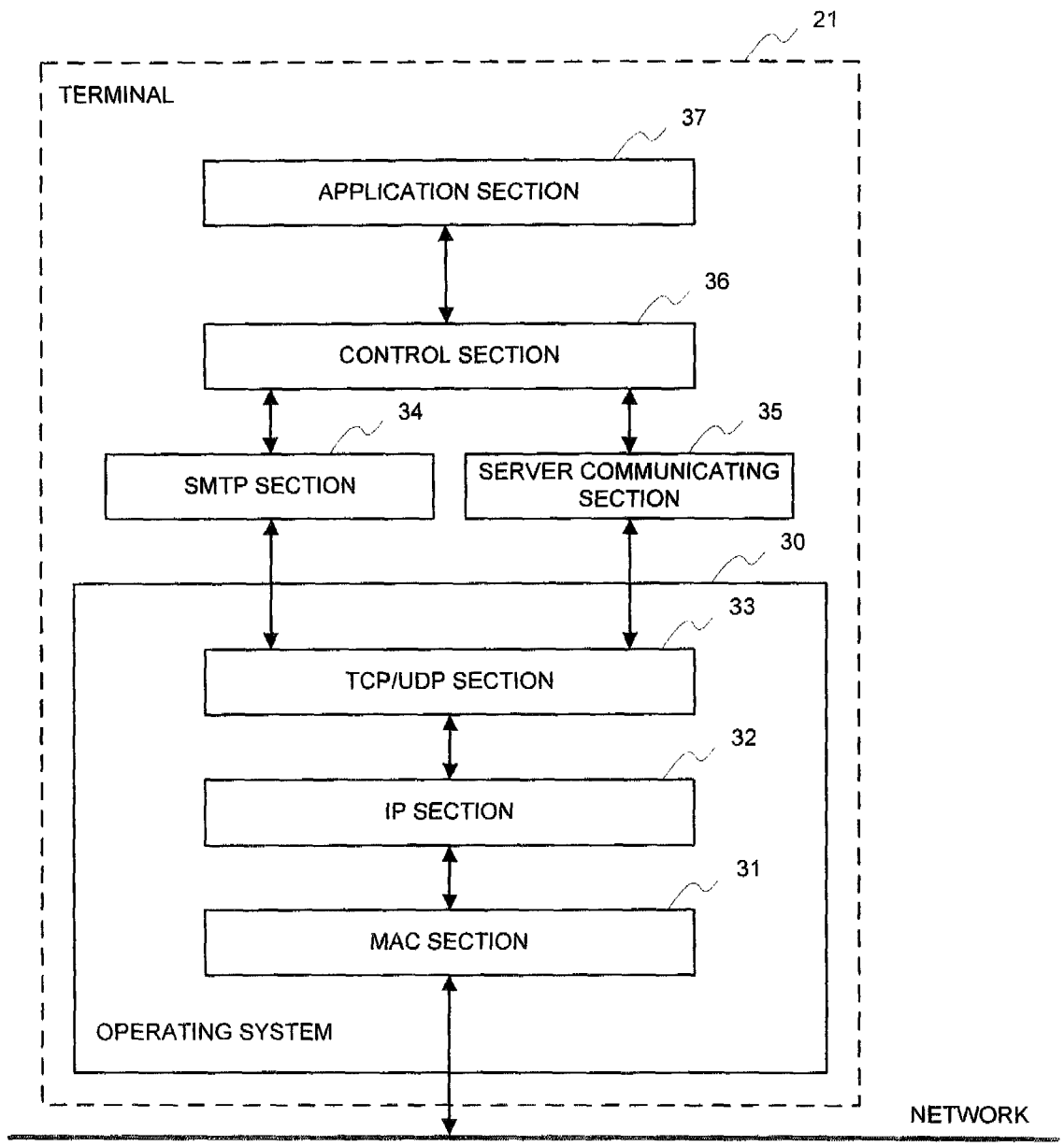
FIG. 4 is a configuration diagram of a terminal 21 in the first embodiment of the present application.

The internal configuration of the terminal 21 is shown in FIG. 4.

As shown in FIG. 4, the terminal 21 has an application section 37, a control section 36, an SMTP section 34, a server communicating section 35, and an operating system 30.

The operating system 30 has a TCP/UDP section 33, an IP section 32, and a MAC section 31.

The MAC section 31 is a standard protocol processing section for transmission/reception of Ethernet packets. In addition to the MAC section 31, the IP section 32 that is a standard protocol processing section for packet routing, and the TCP/UDP section 33 that is a standard protocol processing section for reliable packet communication are operated.

In addition to the operating system 30, the SMTP section 34 that is a standard protocol processing section for transmission of electronic mails, and the server communicating section 35 that is connected to the relay server for packet transmission/reception are operated. Moreover, the control section 36 is operated to call a function in the server communicating section 35 for connection to the session management server or relay server, and call a function in the SMTP section 34 for transmission of a start-connection mail.

The application section 37 communicates with the control section 36 for exchange of packets with an application section in the terminal 27.

Figure 5:
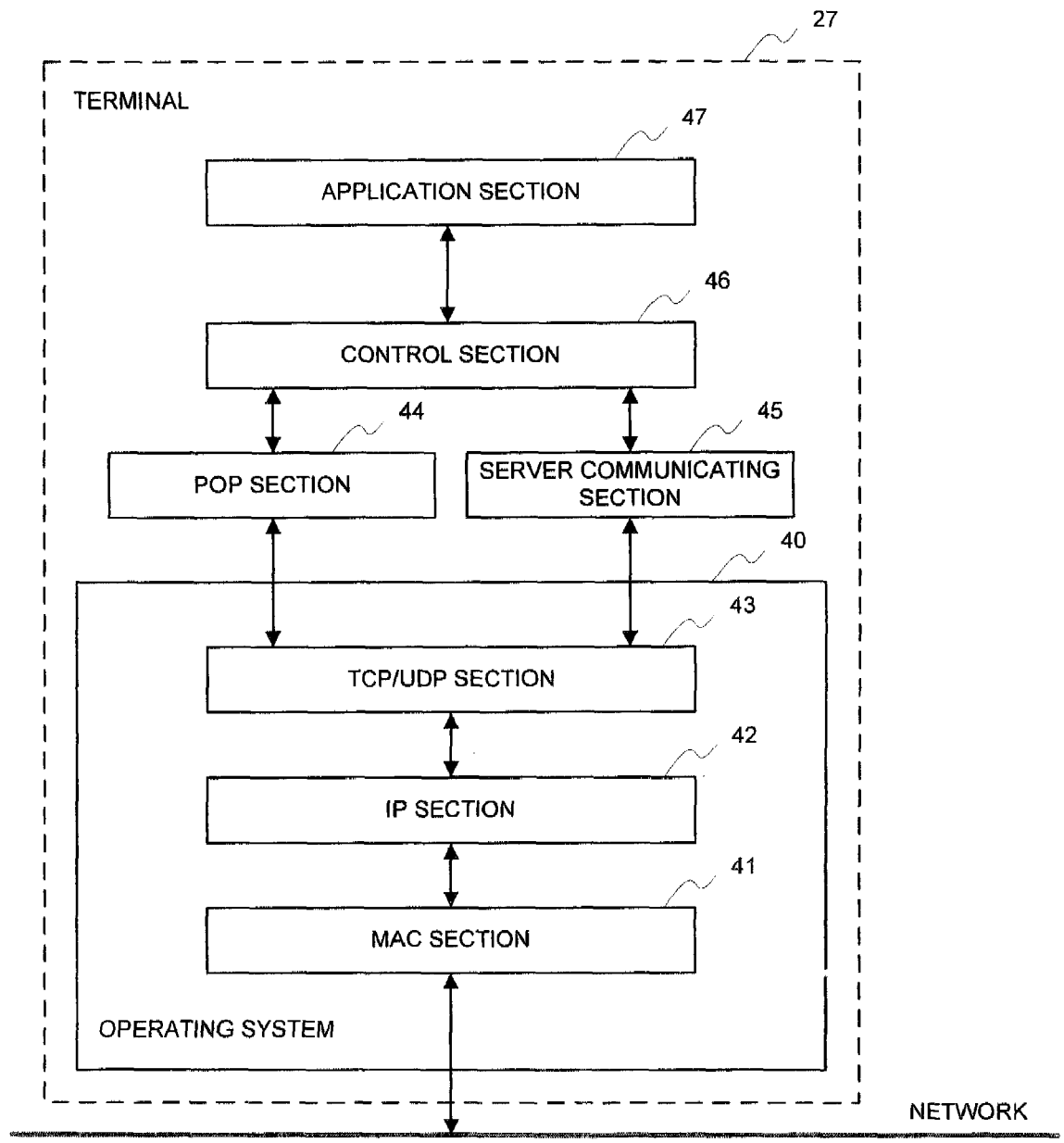
FIG. 5 is a configuration diagram of a terminal 27 in the first embodiment of the present application.

Next, the internal configuration of the terminal 27 is shown in FIG. 5.

Since the difference in the internal configuration of the terminal 27 from that of the terminal 21 is only in a control section 46 and a POP section 44, description of similar components to those in the terminal 21 will be omitted.

The POP section 44 is a standard protocol processing section for reception of electronic mails.

To periodically make a check as to whether a start-connection mail has arrived at the mail server, the control section 46 calls a function in the POP section 44; if the start-connection mail has arrived, the control section 46 analyzes contents of the mail, and calls a function in a server communicating section 45 for connection to a relay server.

Figure 6:
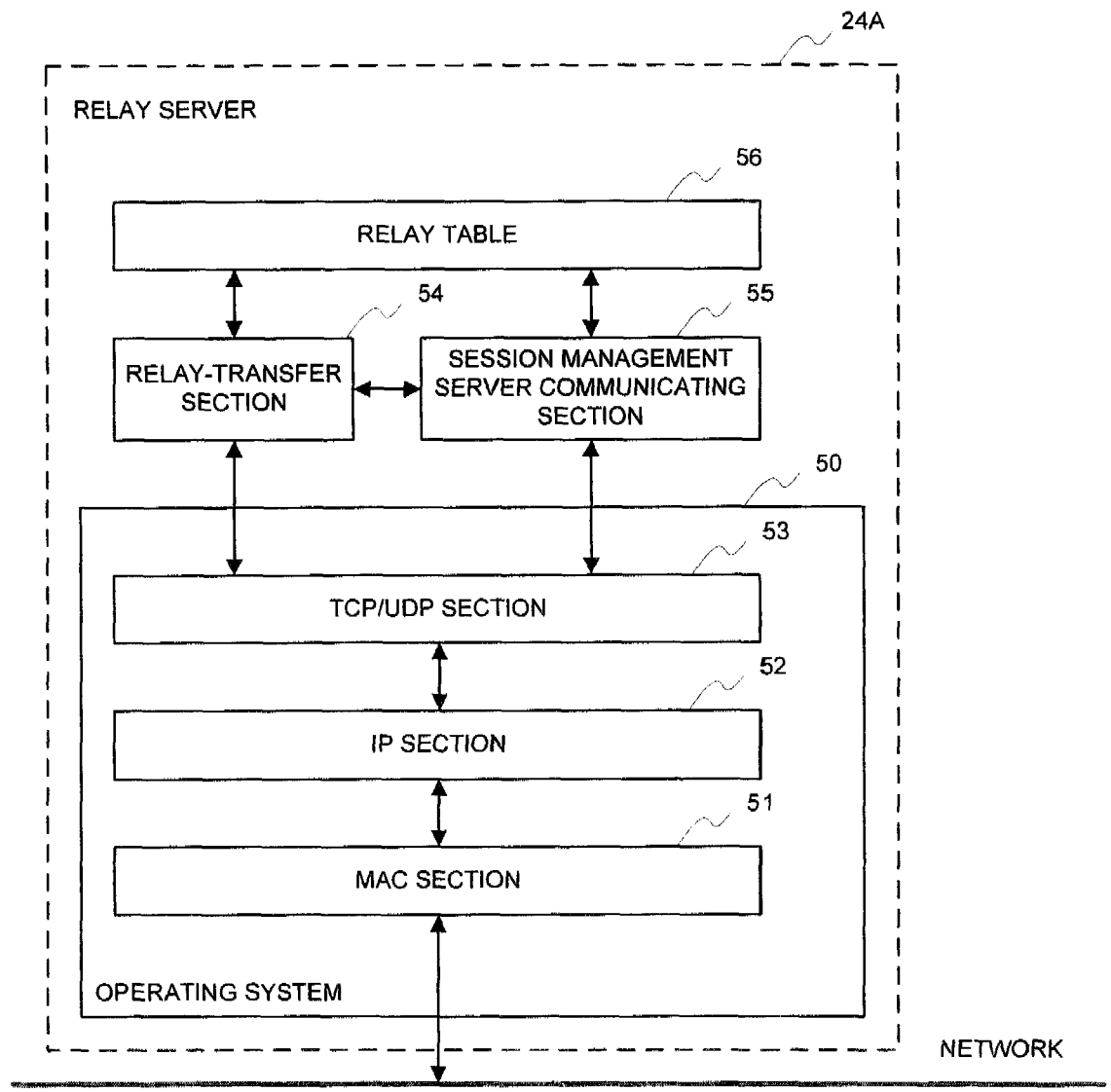
FIG. 6 is a configuration diagram of a relay server in the first embodiment of the present application.

The internal configuration of the relay servers 24A-24C is shown in FIG. 6. Since the relay servers 24A-24C all have the same internal configuration, description thereof will be made only on the relay server 24A and that for others will be omitted.

As shown in FIG. 6, the relay server 24A has a relay-transfer section 54, a session management server communicating section 55, an operating system 50, and a relay table 56. Since the operating system 50 is similar to that in the terminal 21, description thereof will be omitted here.

The session management server communicating section 55 exchanges a message with the session management server 20 to notifying it of the number of relayed-transfer processing, which is the number of sessions for relayed-transfer the section 55 currently performs.

The relay-transfer section 54 waits for a connection from the terminals 21, 27, and if it is connected with the terminals 21, 27, it conducts packet relay-transfer.

The relay table 56 defines correspondence between a unique identification number and a terminal that is relay-connected, as shown in FIG. 7. From the relay table 56, the number of current relayed-transfer processing can be known, and to which terminal a packet from a certain terminal is to be transferred can also be known.

Figure 8:
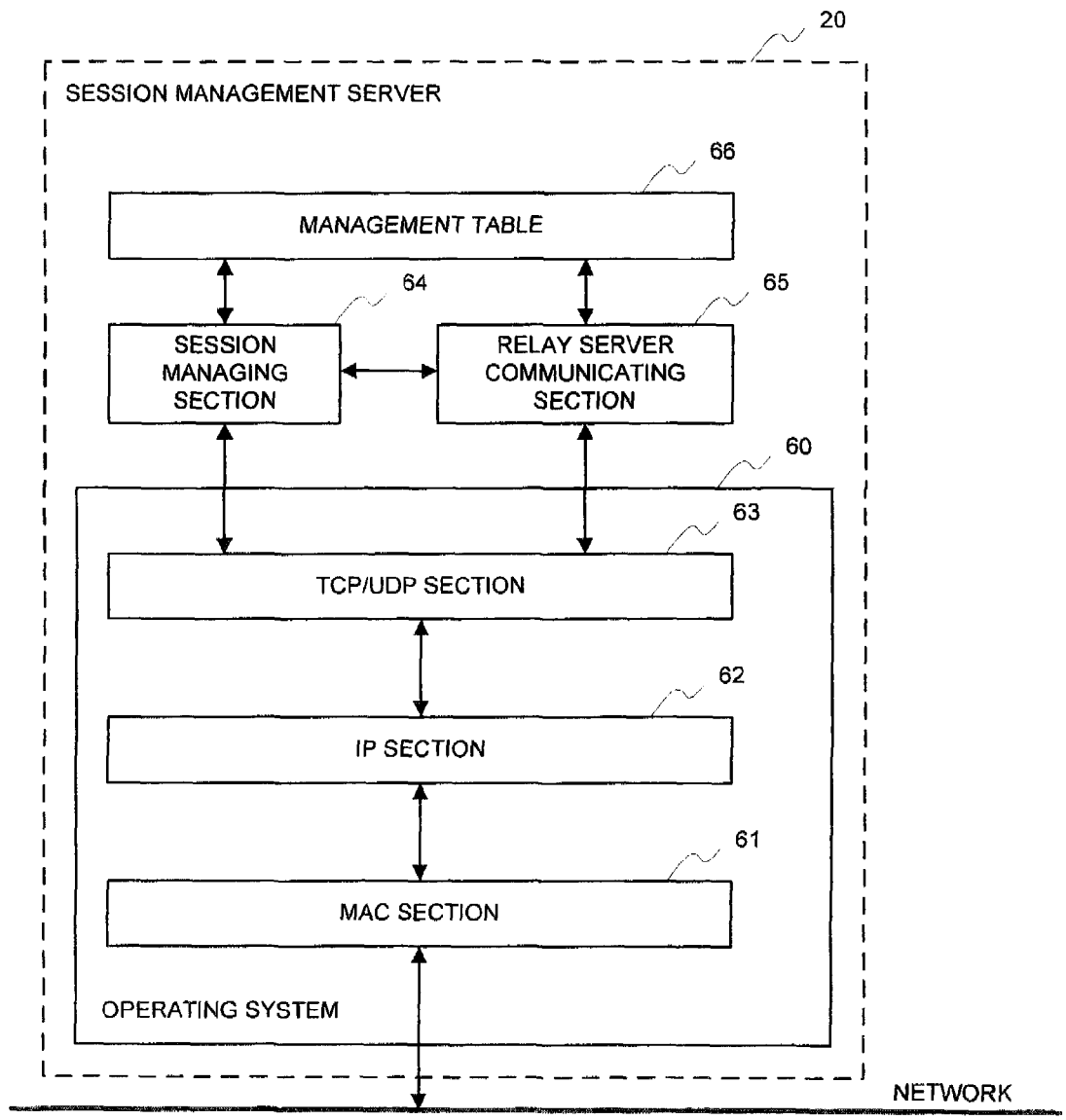
FIG. 8 is a configuration diagram of a session management server in the first embodiment of the present application.

Next, the internal configuration of the session management server 20 is shown in FIG. 8.

As shown in FIG. 8, the session management server 20 comprises a session managing section 64, a relay server communicating section 65, an operating system 60, and a management table 66. Since the operating system 60 is similar to that in the terminal 21, description thereof will be omitted.

The relay server communicating section 65 exchanges messages with the relay servers to monitor the number of current connections, response time or the like for each server.

The session managing section 64 waits for a connection from the terminal 21, and if it is connected with the terminal 21, it notifies the terminal 21 of information for a relay server having a low processing load.

The management table 66, as shown in FIG. 9, is registered with the number of current relayed-transfer processing and identification numbers in an unused state for each server. From the management table 66, a relay server having a low processing load can be identified, and a unique identification number by which a certain terminal is identifiable can be put out.

Next, the operation of the present embodiment will be described.

Figure 10:
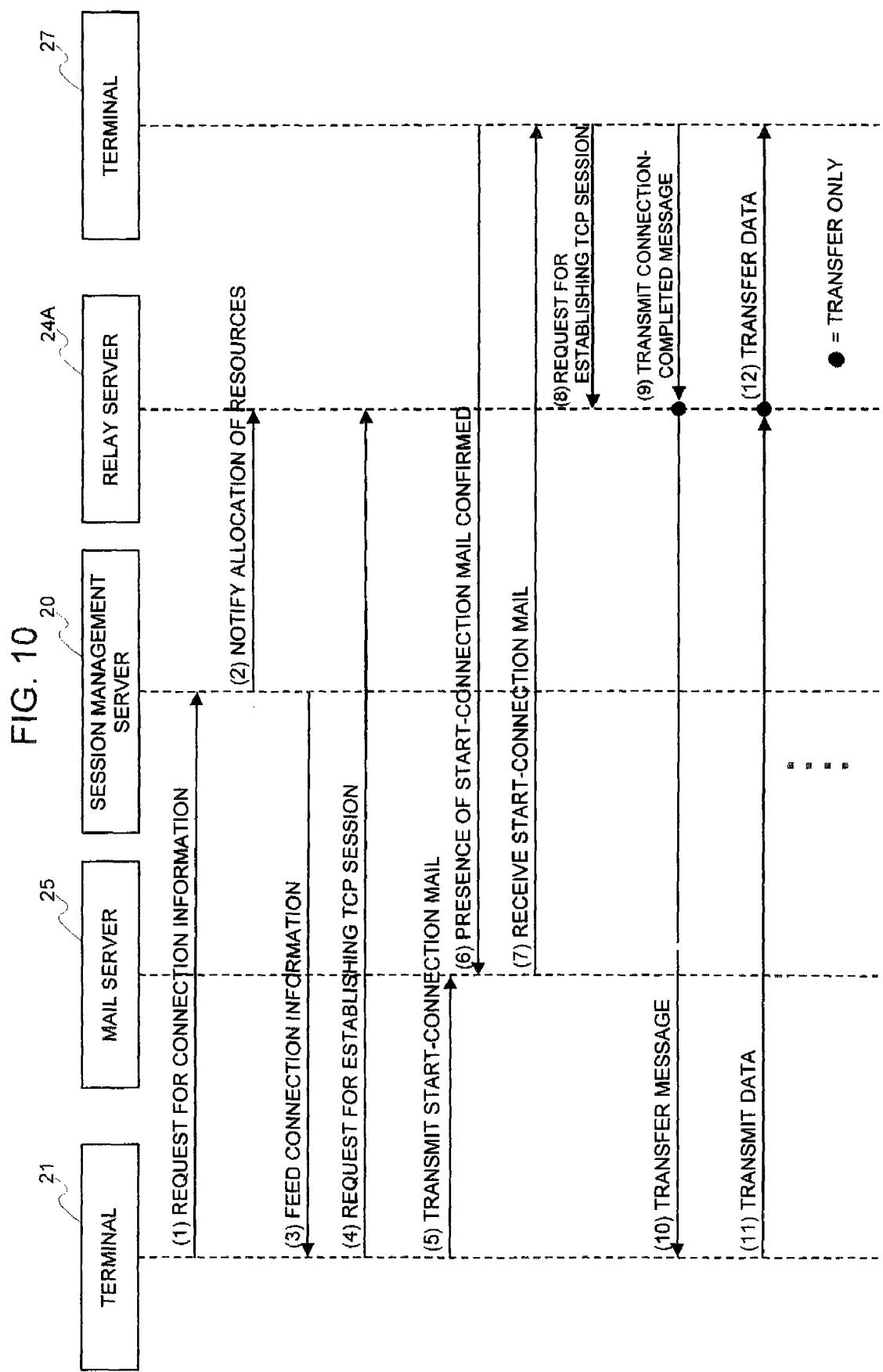
FIG. 10 is a diagram for explaining a connecting operation in the first embodiment of the present application.

FIG. 10 is a flow chart showing processing for starting packet communication between the terminals 21, 27, details of which will be described below.

<Start Packet Communication>

(Step 1)

When the terminal 21 desires to start packet communication with the terminal 27, the control section 36 in the terminal 21 directs the server communicating section 35 to connect to the session management server 20. Following the direction, the server communicating section 35 in the terminal 21 establishes a session with the session managing section 64 in the session management server 20.

(Step 2)

The session managing section 64 in the session management server 20 checks the management table 66 to identify a relay server having a small number of current relayed-transfer processing, i.e., a relay server having a low processing load. The following description will be made assuming that the relay server 24A is selected.

The session management server 20 transmits a resource-allocated message containing an identification number to delegate relay processing to the relay server 24A having a low processing load. This identification number is arbitrarily selected from among those in an unused state for the relay server 24A having a low processing load in the management table 66. In an explanation below, assuming that A1 is selected as the identification number, the explanation will be provided. On receipt of the resource-allocated message, the relay server 24A registers the identification number (A1) into the relay table 56 for use in relaying/transferring sessions from terminals.

(Step 3)

The session management server 20 notifies the terminal 21 of connection information (the IP address and port number) for the selected relay server 24A. At the same time, the identification number (A1) is also notified to the terminal 21.

(Step 4)

The control section 36 in the terminal 21 directs the server communicating section 35 to connect to the relay server 24A designated by the session management server 20. Following the direction, the server communicating section 35 in the terminal 21 establishes a TCP session with the relay-transfer section 54 in the relay server 24A and transmits the identification number (A1) to the relay server 24A.

The relay server 24A in turn registers the connection information into the relay table 56 to link the terminal 21 with the received identification number. Although the following description will be made assuming that a TCP session is established between the terminal 21 and relay server 24A, it is obvious to those skilled in the art that the session may be one in UDP instead of TCP.

(Step 5)

The control section 36 in the terminal 21 directs the SMTP section 34 to transmit a start-connection mail, which is destined for the terminal 27, to the mail server 25. The start-connection mail transmitted here may have its subject specified as "Connection Start Mail," for example, so as to allow discrimination from other electronic mails. Moreover, in the body of the start-connection mail, the IP address and port number of the relay server 24A to which the terminal 27 is to connect, and identification number (A1) are written.

(Step 6)

The control section 46 in the terminal 27 has directed the POP section 44 to periodically (e.g., every thirty seconds) check the mail server 25 as to whether a start-connection mail has arrived. Arrival of a start-connection mail is judged by the presence of an electronic mail with its subject specified as "Connection Start Mail." Moreover, arrival of a start-connection mail may be judged based on, in addition to the subject, whether the sender mail address matches a prespecified mail address, or whether descriptions in the body of the electronic mail match prespecified ones.

(Step 7)

Once the control section 46 in the terminal 27 has confirmed that a start-connection mail is present on the mail server 25, it directs the POP section 44 to receive the start-connection mail and delete the mail from the mail server 25.

(Step 8)

On receipt of the start-connection mail, based on the contents of the mail, the control section 46 in the terminal 27 directs the server communicating section 45 to connect to the relay server 24A. The server communicating section 45 establishes a TCP session with the relay-transfer section 54 in the relay server 24A.

(Step 9)

Once the control section 46 in the terminal 27 has established a session with the relay server 24A, it transmits a connection-completed message to the relay server 24A. Moreover, the identification number (A1) contained in the start-connection mail is incorporated in the connection-completed message.

(Step 10)

On receipt of the connection-completed message from the terminal 27, the relay-transfer section 54 in the relay server 24A registers connection information into the relay table 56 based on the identification number (A1) and starts relay-transfer processing between the terminals 21, 27 having the matched identification number (A1). Representing the TCP session with the terminal 21 as TCP session A and that with the terminal 27 as TCP session B, the relay server 24 transfers the data received from the TCP session A to the TCP session B, and the data received from the TCP session B to the TCP session A. Moreover, the relay-transfer section 54 in the relay server 24A transmits the connection-completed message received from the terminal 27 to the terminal 21 via the TCP session A.

(Step 11)

On receipt of the connection-completed message, the control section 36 in the terminal 21 starts packet communication with the terminal 27. The control section 36 passes the data from the application section 37 to the server communicating section 35, and transmits it to the relay server 24 via the TCP session A.

(Step 12)

The relay-transfer section 54 in the relay server 24A transfers the data sent from the TCP session A to the TCP session B. The data is delivered to the application section 47 via the server communicating section 45 and control section 46 in the terminal 27. Thus, packets can be transmitted from the terminal 21 to the terminal 27 via the relay server 24A. Moreover, although the description has been made on a case in which data is transmitted from the terminal 21 to the terminal 27 in the aforementioned operation, it is obvious that data may be similarly transmitted from the terminal 27 to the terminal 21.

Packet communication is thus started between the terminals 21, 27.

It should be noted that a modification may be made on the processing such that the connection-completed message, which is transmitted from the relay server 24A to the terminal 21 at Step 6, is transmitted from the terminal 27 to the terminal 21 via the relay server 24A.

Moreover, the aforementioned operation has been described as providing the terminal 27 as a mail client that makes a check as to whether a mail has arrived at the mail server 27 using a POP section. In contrast, the terminal 27 may comprise an SMTP section to have a function as a mail server so that a mail may be directly delivered at the terminal 27.

Figure 11:
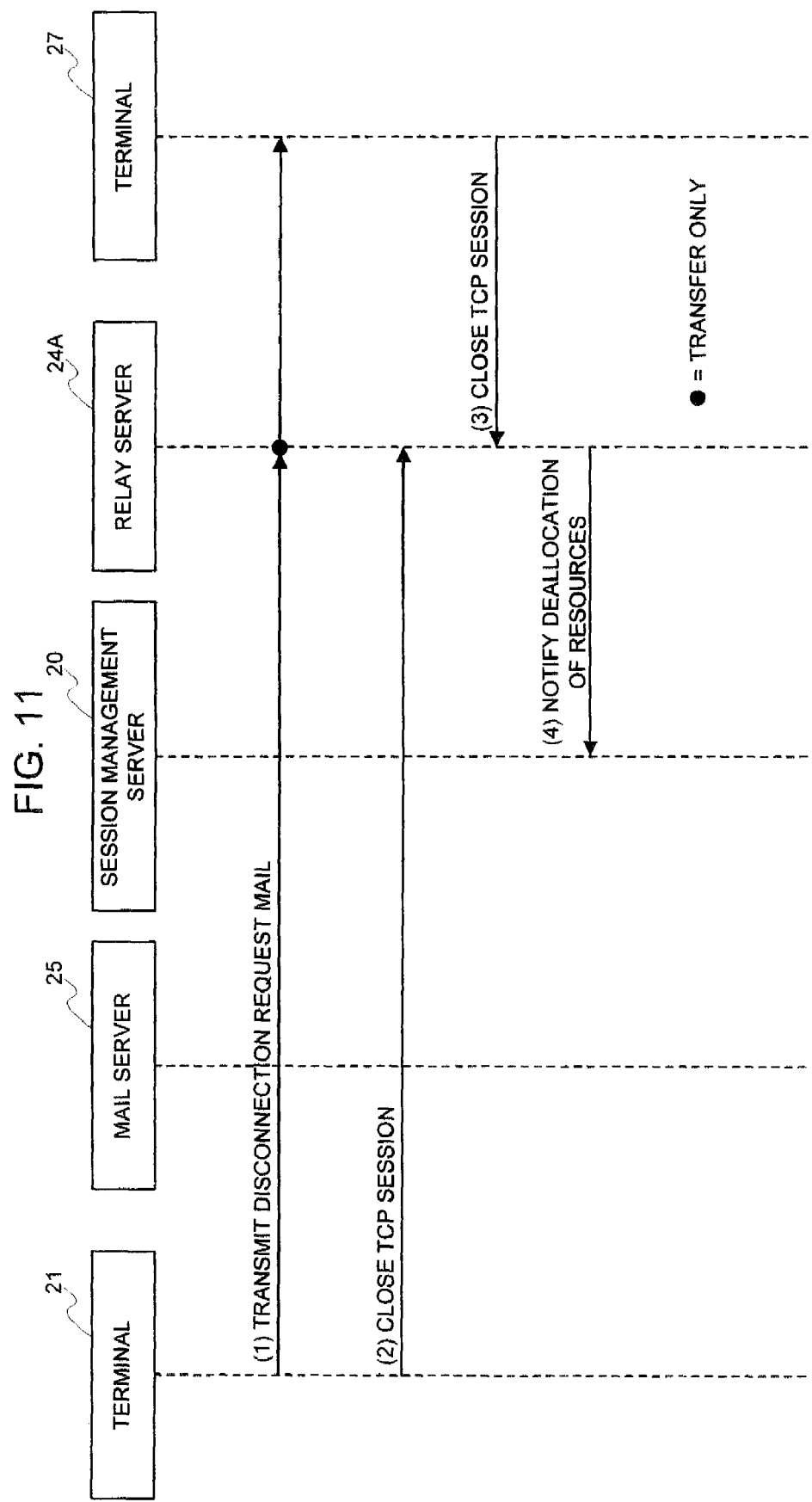
FIG. 11 is a diagram for explaining a disconnecting operation in the first embodiment of the present application.

Next, processing to terminate the aforementioned packet communication will be described hereinbelow. FIG. 11 is a flow chart showing processing to terminate packet communication between the terminals 21, 27, details of which will be described below.

<Terminate Packet Communication>

(Step 1)

When the terminal 21 desires to terminate packet communication with the terminal 27, the control section 36 in the terminal 21 first transmits a disconnection request message to the terminal 27 for terminating data communication. The disconnection request message is delivered to the terminal 27 through relay processing at the relay server 24A.

(Step 2)

After transmitting the disconnection request message, the control section 36 in the terminal 21 directs the server communicating section 35 to disconnect the TCP session with the relay server 24A. This causes the TCP session between the terminal 21 and relay server 24A to be disconnected.

(Step 3)

In a similar way, on receipt of the aforementioned disconnection request message, the control section 46 in the terminal 27 directs the server communicating section 45 to disconnect the TCP session with the relay server 24A. This causes the TCP session between the terminal 27 and relay server 24A to be disconnected. On the other hand, once the TCP sessions from the terminals 21, 27 have been disconnected, the relay server 24A terminates the relay processing between the terminals.

(Step 4)

After the relay processing between the terminals 21, 27 has been terminated, the relay server 24A deletes the entry for the identification number (A1) in the relay table 56 to erase the corresponding information therefrom. Moreover, it transmits a resource-deallocated message containing the identification number (A1) to the session management server 20 to notify it of the fact that the processing load is reduced. On receipt of the resource-deallocated message, the session management server 20 increases the number of relay-connections of the relay server 24A in the management table 66, and adds A1 to the field of the identification number in an unused state.

Packet communication between the terminals 21, 27 is thus terminated.

The packet communication termination processing may be executed starting from the terminal 27. In this case, the processing at Steps 1-3 of the packet communication termination procedure is executed with the terminals 21, 27 exchanged for each other.

Moreover, the time at which packet communication is to be terminated may be a time other than that explicitly specified by the terminal 21 as described above. For example, if a keep-alive signal, which is for making a communication partner know the terminal is "alive," is not received, the aforementioned packet communication termination processing may be executed or the established TCP session may be forcibly disconnected. When the TCP session is to be forcibly disconnected, the control section 36 in the terminal 21, the control section 46 in the terminal 27, or the relay-transfer section 54 in the relay server 24A may autonomously disconnect the TCP session.

While the preceding description has been made assuming an environment having a plurality of relay servers connected to the network 23 as shown in FIG. 3, the method may be applied to an environment having only one relay server connected.

Moreover, while the preceding description has been made assuming that the function of the session management server 20 and that of the relay server 24 are split to separate servers, the functions of the session management server and relay server may be integrated in one server.

Now exemplary effects of the first embodiment will be described.

According to the first embodiment of the present application, a connection-completed message is transmitted from the relay server 24 to the terminal 21 via a TCP session, whereby the number of mail transmissions/receptions required to start packet communication can be reduced, thus enabling quick start of packet communication. In addition, this effect can be obtained both by relaying the communication between the terminals using the relay server searched by the session management server and by relaying the communication between the terminals using a predetermined relay server.

Moreover, by distributing packet relay processing among relay servers by the session management server taking account of the load conditions among the relay servers, concentration of the processing load on a specific relay server can be prevented to improve the response speed of the relay servers, thus enabling quick start of packet communication. For these reasons, the object of the present application is attained.

Next, a second embodiment of the present application will be described in detail with reference to the accompanying drawings.

In the first embodiment of the present application, the start-connection mail is transmitted from the terminal 21. Hence, the SMTP section 34 is incorporated into the terminal 21.

According to the second embodiment of the present application, the start-connection mail is transmitted from the relay server 24A, rather than from the terminal 21, so that a need to incorporate the SMTP section 34 into the terminal 21 is eliminated to achieve a configuration that can be implemented by devices whose hardware resources are strictly limited, a memory size required to incorporate the SMTP section 34 cannot be secured, such as PDA (Personal Digital Assistant) and the like.

The configuration of the second embodiment of the present application will now be described.

Figure 12:
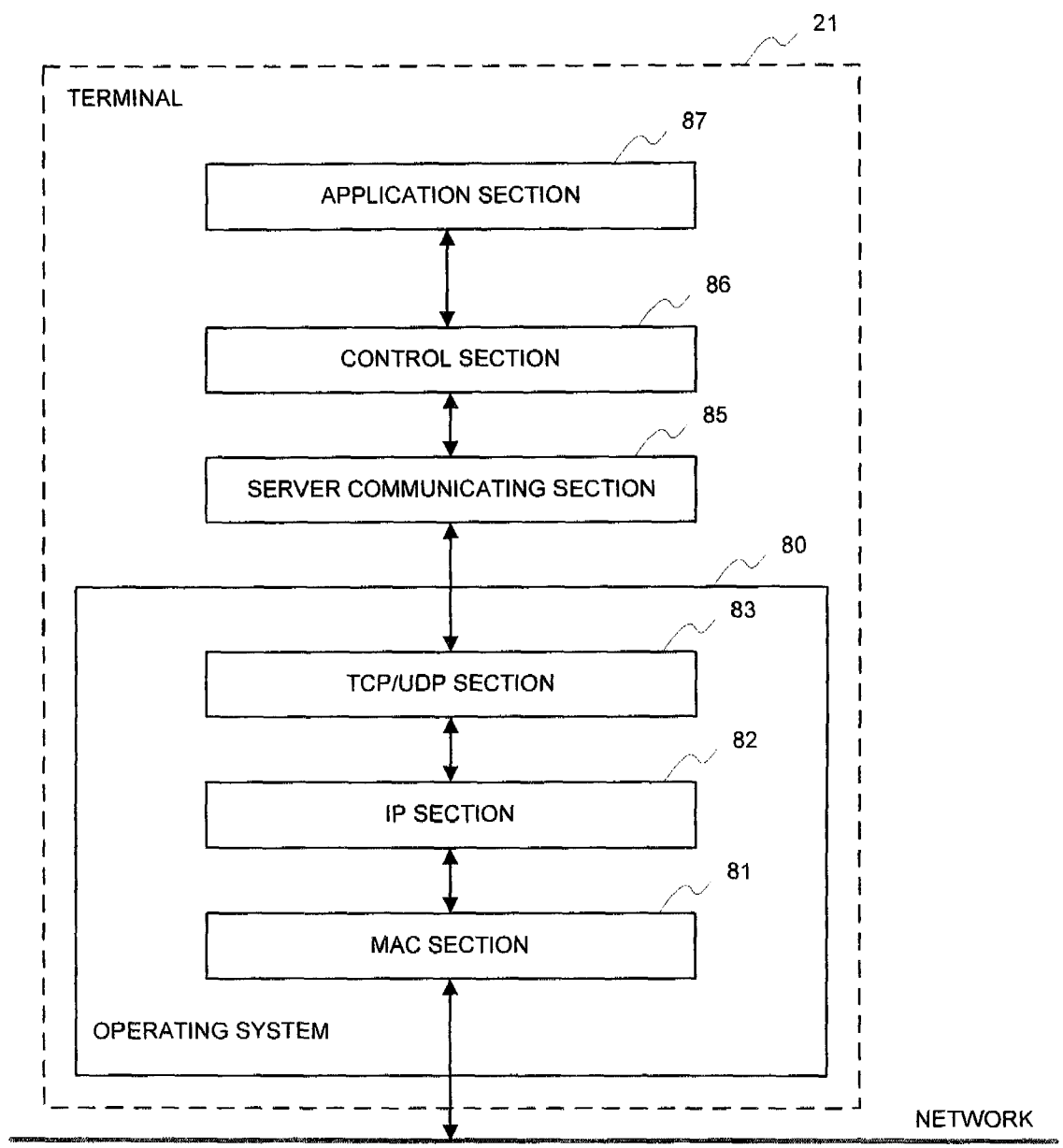
FIG. 12 is a configuration diagram of the terminal 21 in a second embodiment of the present application.
Figure 13:
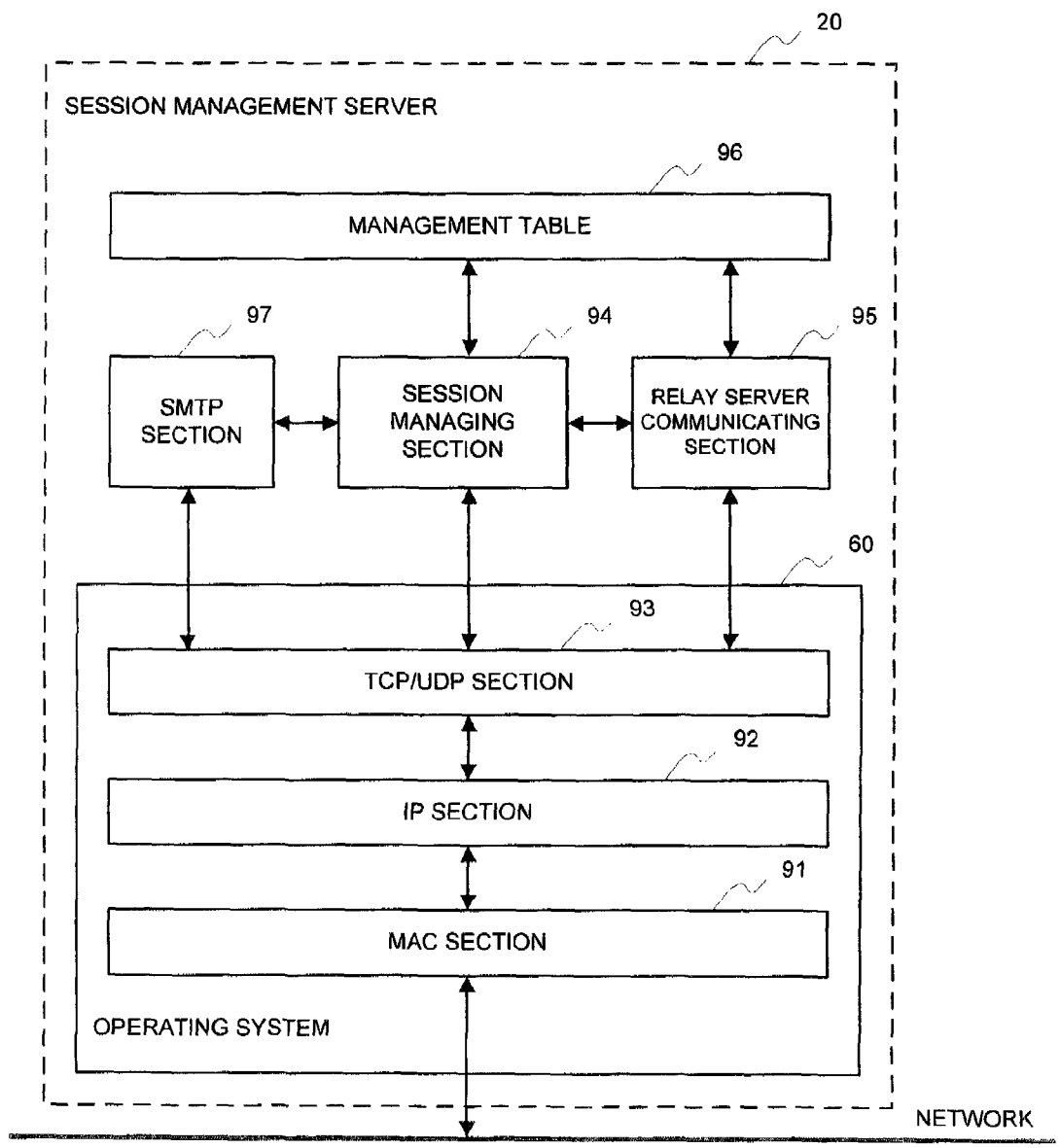
FIG. 13 is a configuration diagram of the session management server in the second embodiment of the present application.

According to the second embodiment of the present application, the SMTP section 34 in the terminal 21 of FIG. 4 is moved to the relay server 24. The configuration of the terminal 21 and relay server 24A in the second embodiment of the present application is shown in FIGS. 12, 13. Since such a configuration is similar to that for the first embodiment, description will be omitted.

The operation of the present embodiment will now be described.

Figure 14:
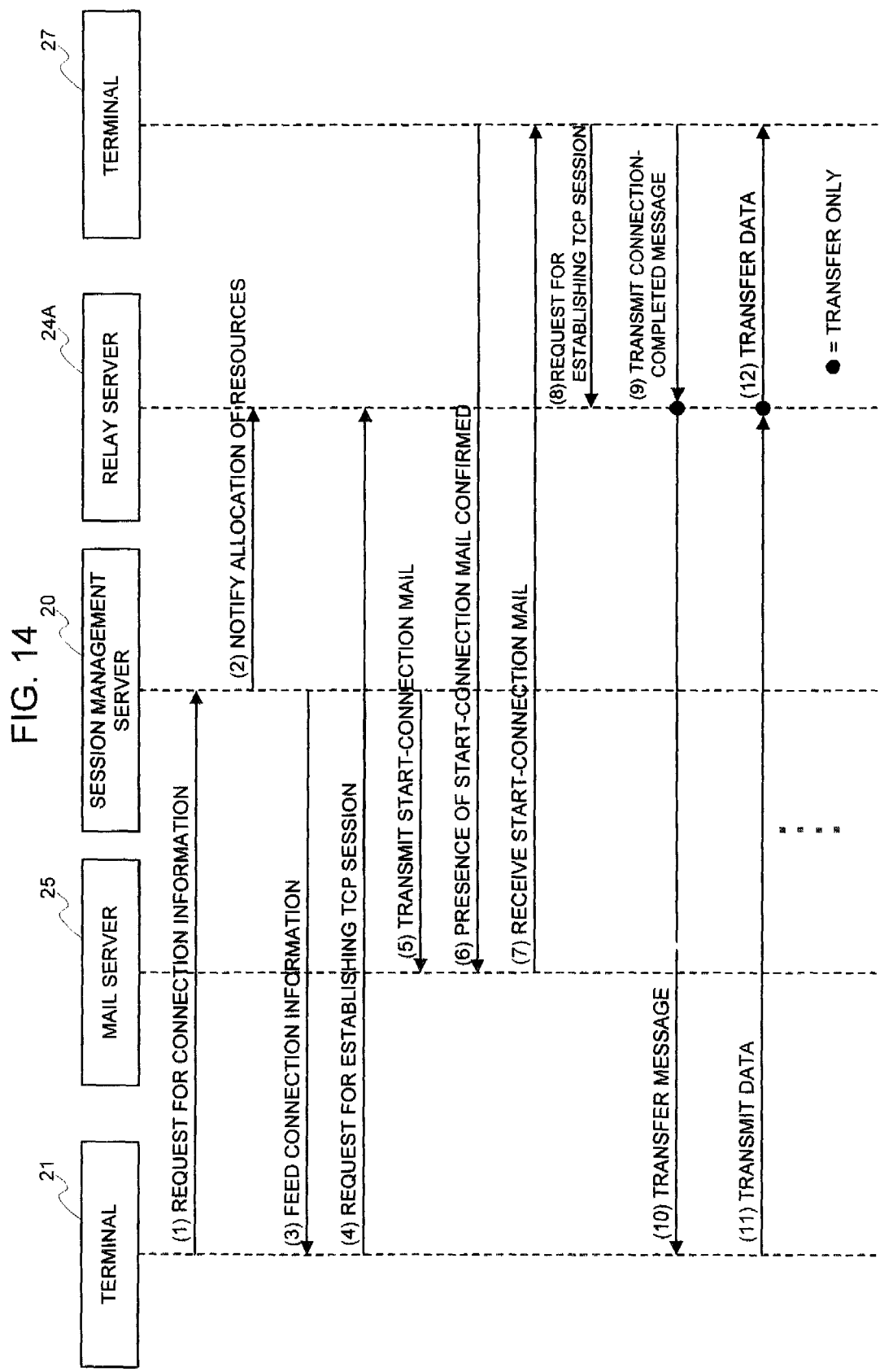
FIG. 14 is a diagram for explaining a connecting operation in the second embodiment of the present application.

FIG. 14 is a flow chart showing processing for starting packet communication between the terminals 21, 27, details of which will be described below.

<Start Packet Communication>

(Step 1)

When the terminal 21 desires to start packet communication with the terminal 27, the control section 86 in the terminal 21 first directs the server communicating section 85 to connect to the session management server 20. Following the direction, the server communicating section 85 in the terminal 21 establishes a session with the session managing section 94 in the session management server 20.

(Step 2)

The session managing section 94 in the session management server 20 checks the management table 96 to identify a relay server having a small number of current relayed-transfer processing, i.e., a relay server having a low processing load. Then, a resource-allocated message containing an identification number is transmitted to the relay server 24A having a low processing load to delegate relay processing to it. This identification number is selected from among those in an unused state in the management table 96. In an explanation below, assuming that A1 is selected as the identification number, the explanation will be provided. On receipt of the resource-allocated message, the relay server 24A registers the identification number (A1) into the relay table 56 for use in relaying/transferring sessions from terminals.

(Step 3)

The session managing section 94 in the session management server 20 notifies the terminal 21 of connection information (the IP address and port number) for the selected relay server 24A. At the same time, the identification number (A1) is also notified to the terminal 21.

(Step 4)

The control section 86 in the terminal 21 directs the server communicating section 85 to connect to the relay server 24A designated by the session management server 20. Following the direction, the server communicating section 85 in the terminal 21 establishes a TCP session with the relay-transfer section 54 in the relay server 24A and transmits the identification number (A1) to the relay server 24A. The relay server 24A in turn registers the connection information into the relay table 56 to link the terminal 21 with the received identification number. Although the following description will be made assuming that a TCP session is established between the terminal 21 and relay server 24A, it is obvious to those skilled in the art that the session may be one in UDP instead of TCP.

(Step 5)

The session control section 94 in the session management server 20 directs the SMTP section 97 to transmit a start-connection mail, which is destined for the terminal 27, to the mail server 25. The start-connection mail transmitted here may have its subject specified as "Connection Start Mail," for example, so as to allow discrimination from other electronic mails. Moreover, in the body of the start-connection mail, the IP address and port number of the relay server 24A to which the terminal 27 is to connect, and identification number (A1) are written.

Since the procedure thereafter is similar to that at Steps 6-11 in the first embodiment of the present application, description thereof will be omitted.

Packet communication is thus started between the terminals 21, 27.

<Terminate Packet Communication>

Since the procedure for terminating packet communication is similar to that at Steps 1-4 in the first embodiment of the present application, description thereof will be omitted.

Packet communication between the terminals 21, 27 is thus terminated.

Now an exemplary effect of the second embodiment of the present application will be described.

According to the second embodiment of the present application, a start-connection mail is transmitted from the relay server 24, rather than from the terminal 21, whereby a need to incorporate the SMTP function into the terminal 21 is eliminated, and the present system can be installed in portable devices whose hardware resources are strictly limited.

Next, a third embodiment of the present application will be described in detail with reference to the accompanying drawings.

In the first embodiment of the present application, the configuration in which a start-connection mail is exchanged between the terminals 21, 27 was explained.

According to the third embodiment of the present application, a need to transmit a start-connection mail is eliminated to reduce the number of mail transmissions/receptions required to start packet communication, thus providing a configuration enabling quick start of packet communication.

The configuration of the present embodiment will now be described.

Figure 15:
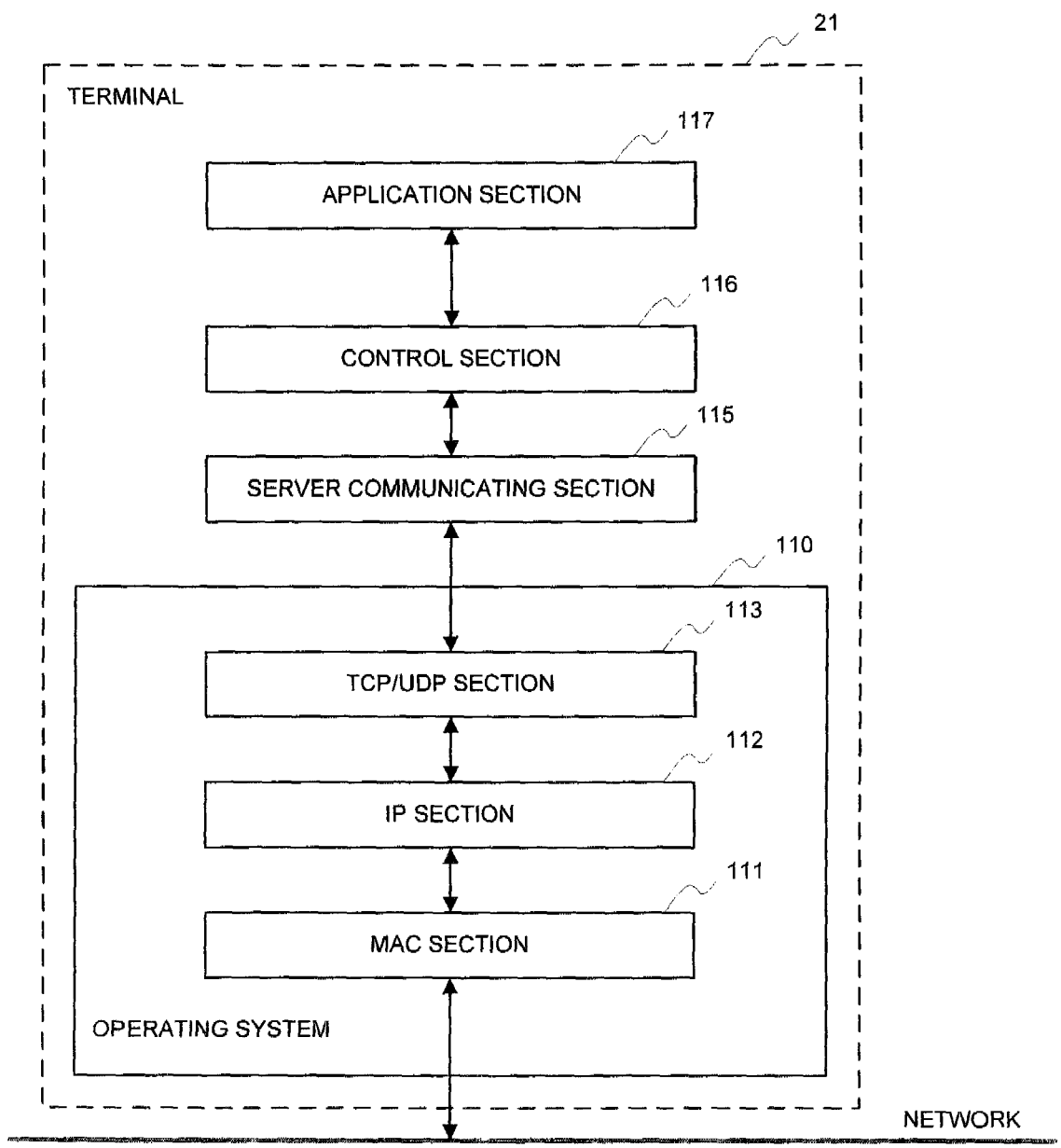
FIG. 15 is a configuration diagram of the terminal 21 in a third embodiment of the present application.
Figure 16:
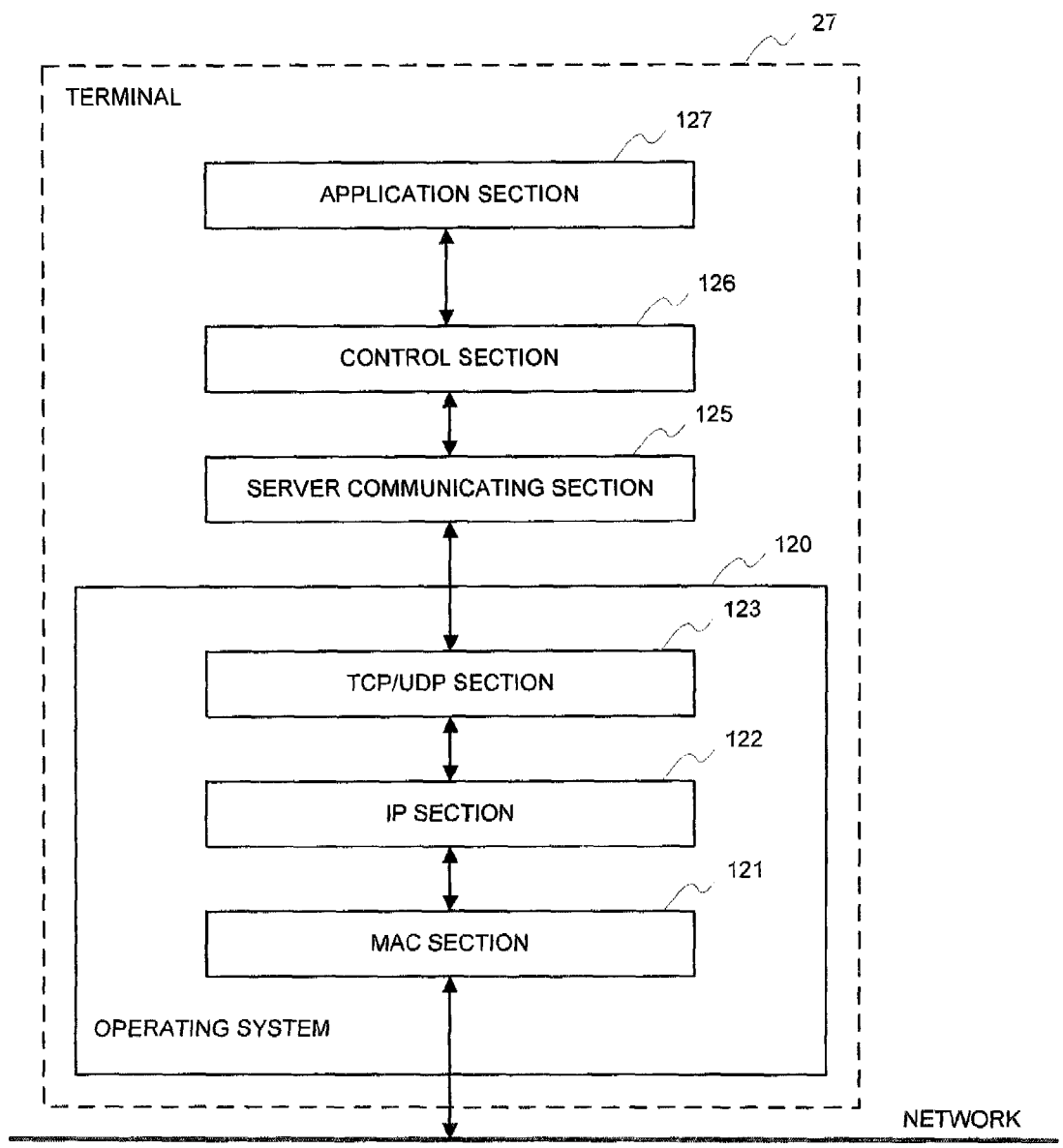
FIG. 16 is a configuration diagram of the terminal 27 in the third embodiment of the present application.
Figure 17:
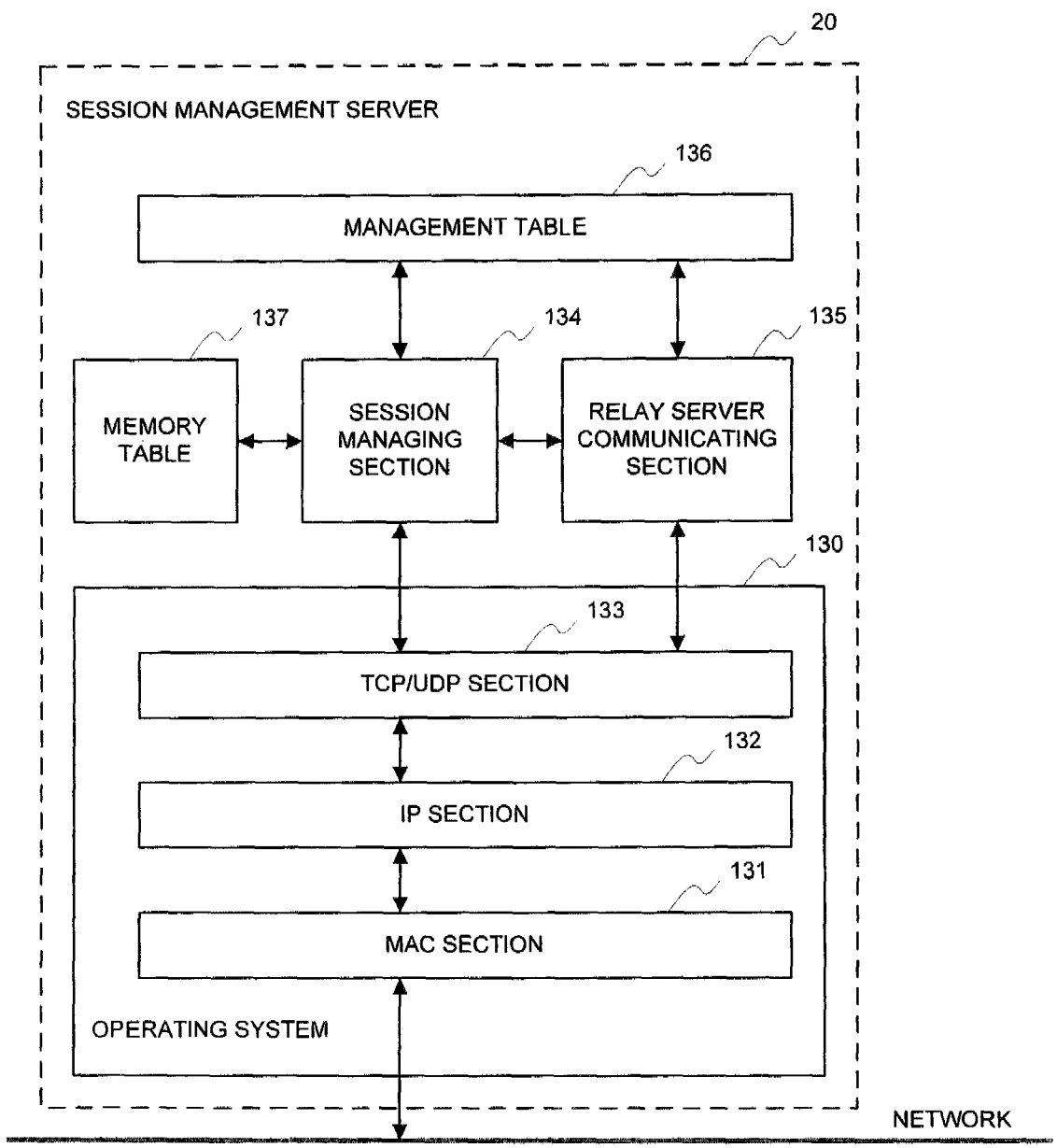
FIG. 17 is a configuration diagram of the session management server in the third embodiment of the present application.

According to the third embodiment of the present application, the SMTP section in the terminal 21 and the POP section in the terminal 27 are eliminated. Configurations of the terminal 21, terminal 27, and session management server 20 of the third embodiment of the present application are shown in FIGS. 15-17.

According to the third embodiment of the present application, to solve the aforementioned problem, processing executed at a control section 116 in the terminal 21, a control section 126 in the terminal 27, and a session control section 134 in the session management server 20 are modified.

In order to make a connection with the session management server 20, the control section 116 in the terminal 21 calls a function in the server communicating section 115 to TCP-connect to the session management server and transmit a start-connection message to the session management server 20.

To periodically make a check as to whether a start-connection message has arrived at the session management server 20, the control section 126 in the terminal 27 calls a function in the server communicating section 125 to TCP-connect to the session management server 20; and if the start-connection message has arrived, it calls a function in the server communicating section 125 to download the start-connection message.

In addition to the processing of the session managing section 64 shown in FIG. 8, the session managing section 134 in the session management server 20 saves the start-connection message received from the terminal 21 into a memory table 137 and transmits a start-connection message to the terminal 27 in response to a request by the terminal 27.

The memory table 137 makes correspondence between ID/password and a start-connection message, as shown in FIG. 18. By looking up the memory table 137, the start-connection message transmitted from the terminal 21 can be received by the terminal 27.

Since other components are similar to those shown in the drawings for the second embodiment, description thereof will be omitted.

Next, the operation of the third embodiment of the present application will be described in detail with reference to FIG. 19.

Figure 19:
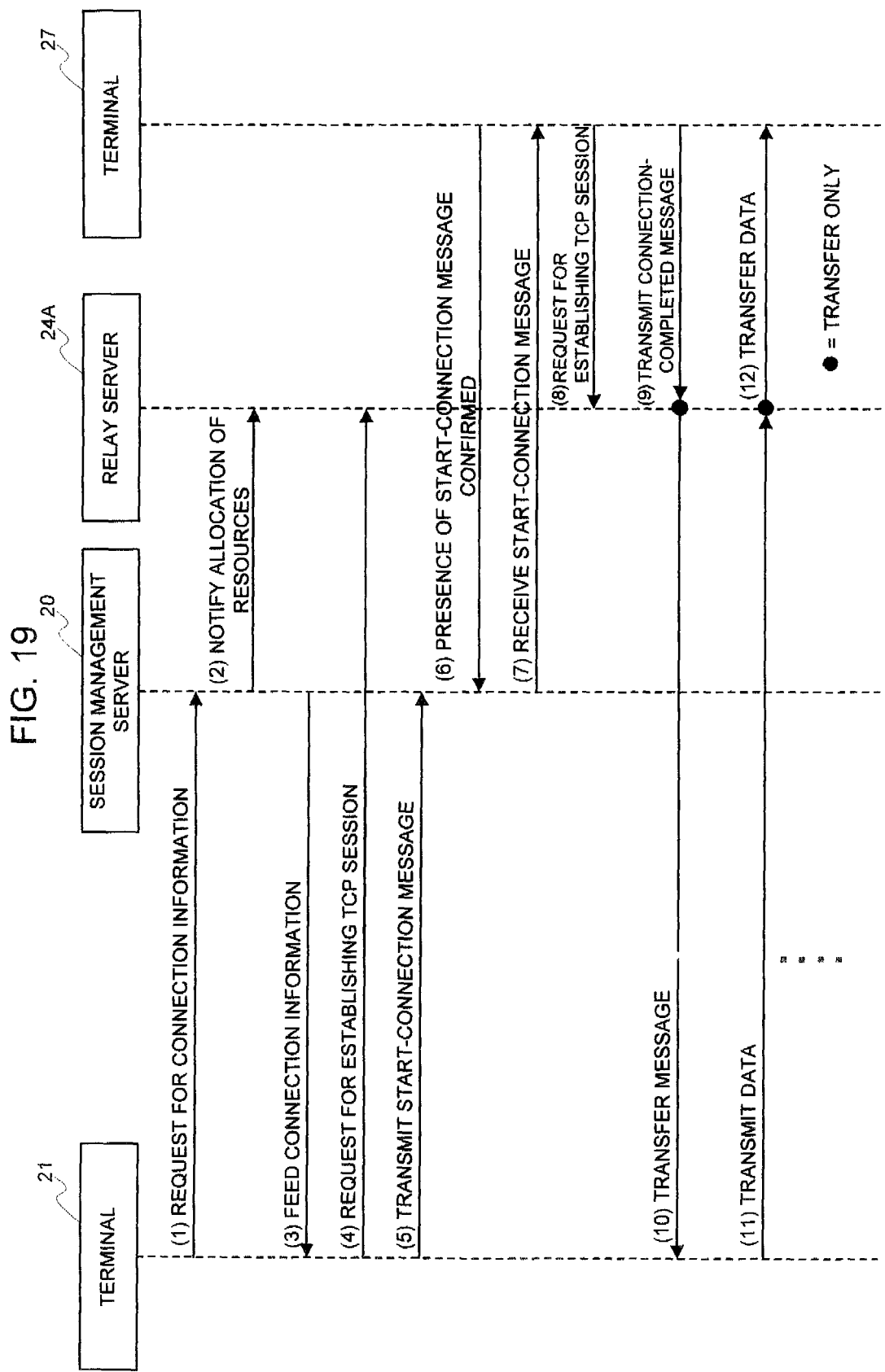
FIG. 19 is a diagram for explaining a connecting operation in the third embodiment of the present application.

FIG. 19 is a flow chart showing processing for starting packet communication between the terminals 21, 27, details of which will be described below.

<Start Packet Communication>

(Step 1)

When the terminal 21 desires to start packet communication with the terminal 27, the control section 116 in the terminal 21 first directs the server communicating section 115 to connect to the session management server 20. Following the direction, the server communicating section 115 in the terminal 21 establishes a session with a session managing section 134 in the session management server 20.

(Step 2)

The session managing section 134 in the session management server 20 checks the management table 136 to identify a relay server having a small number of current relayed-transfer processing, i.e., a relay server having a low processing load. Then, a resource-allocated message containing an identification number is transmitted to the relay server 24A having a low processing load to delegate relay processing to it. The identification number is selected from among those in an unused state in the management table 136. In an explanation below, assuming that A1 is selected as the identification number, the explanation will be provided. On receipt of the resource-allocated message, the relay server 24A registers the identification number (A1) into the relay table 56 for use in relaying/transferring sessions from terminals.

(Step 3)

The session management server 20 notifies the terminal 21 of connection information (the IP address and port number) for the selected relay server 24A. At the same time, the identification number (A1) is also notified to the terminal 21.

(Step 4)

The control section 116 in the terminal 21 directs the server communicating section 115 to connect to the relay server 24A designated by the session management server 20. Following the direction, the server communicating section 115 in the terminal 21 establishes a TCP session with the relay-transfer section 54 in the relay server 24A and transmits the identification number (A1) to the relay server 24A. The relay server 24A in turn registers the connection information into the relay table 56 to link the terminal 21 with the received identification number. Although the following description will be made assuming that a TCP session is established between the terminal 21 and relay server 24A, it is obvious to those skilled in the art that the session may be one in UDP instead of TCP.

(Step 5)

The control section 116 in the terminal 21 directs the server communicating section 115 to transmit a start-connection message, which is destined for the terminal 27, to the session management server 20. Since the start-connection message is transmitted in an ordinary TCP session, it is quickly delivered to the session management server 20, unlike electronic mails that potentially suffer from delayed delivery. On receipt of the start-connection message from the terminal 21, the session management server 20 registers an entry in the memory table 137, and manages the start-connection message on a terminal-by-terminal basis so as to allow discrimination from those sent by other terminals. Thus, FIG. 18 shows a case in which a start-connection message to be saved in the memory table is registered with ID/password linked thereto; however, the linked information is not limited to the ID/password, and any kind of information may be used insofar as it allows discrimination between the terminals.

(Step 6)

On the other hand, the control section 126 in the terminal 27 has directed the server communicating section 125 to periodically (e.g., every ten seconds) check the session management server 20 as to whether a start-connection message destined for the terminal 27 itself has arrived. Specifically, a TCP session is established from the terminal 27 to the session management server 20, and a check is made as to whether a start-connection message destined for the terminal 27 itself is stored in the memory table 137 in the session management server. If no start-connection message has arrived at the session management server, the established TCP session may be disconnected.

(Step 7)

Once the control section 126 in the terminal 27 has confirmed that a start-connection message is present on the session management server 20, it directs the server communicating section 125 to receive the start-connection message and delete it from the session management server 20.

(Step 8)

On receipt of the start-connection message, the control section 126 in the terminal 27 directs the server communicating section 115 to connect to the relay server 24A. The server communicating section 115 establishes a TCP session with the relay-transfer section 134 in the relay server 24A. The TCP session established here may alternatively be that described regarding the aforementioned procedure at Steps 3-4 and it is not necessarily re-established. However, the following description will be made assuming that the TCP session for checking a start-connection message and that for exchanging actual packets are separately established.

Since the steps thereafter are similar to the procedure at Steps 9-12 in the first embodiment of the present application, detailed description thereof will be omitted.

Packet communication is thus started between the terminals 21, 27.

<Terminate Packet Communication>

(Step 1)

Since the procedure for terminating packet communication is similar to that at Steps 1-4 in the first embodiment of the present application, detailed description thereof will be omitted.

Packet communication between the terminals 21, 27 is thus terminated.

Now an exemplary effect of the third embodiment of the present application will be described.

According to the third embodiment of the present application, a start-connection message and a connection-completed message are transmitted/received via a TCP session, whereby the number of mail transmissions/receptions required to start packet communication can be reduced. Since this operation is unaffected by delayed delivery of mails, packet communication between the terminals 21, 27 can be quickly started. In addition, this effect can be obtained both by relaying the communication between the terminals using the relay server searched by the session management server and by relaying the communication between the terminals using a predetermined relay server. For this reason, the object of the present application is attained.

Next, a fourth embodiment of the present application will be described in detail with reference to the accompanying drawings.

According to Patent Document 1, a user ID and a password are transmitted without encryption when the terminal 21 attempts to connect to the relay server 24. Thus, such information may be intercepted by malicious third parties on the Internet, thus posing a risk that the terminal 21 or relay server 24 may be hacked.

According to the fourth embodiment of the present application, to solve the aforementioned problem in the related art, encryption information is communicated between the terminals 21, 27, and then, the terminal 21 encrypts the user ID and password using the encryption information and transmits them to the terminal 27. This can prevent information such as a user ID or a password from being intercepted by malicious third parties on the Internet, thus eliminating the risk that the terminal 21 or relay server 24 is hacked.

The configuration of the present embodiment will now be described.

According to the fourth embodiment of the present application, to solve the aforementioned problem, processing executed at the control section in the terminal 21 and that in the terminal 27 are modified.

Figure 20:
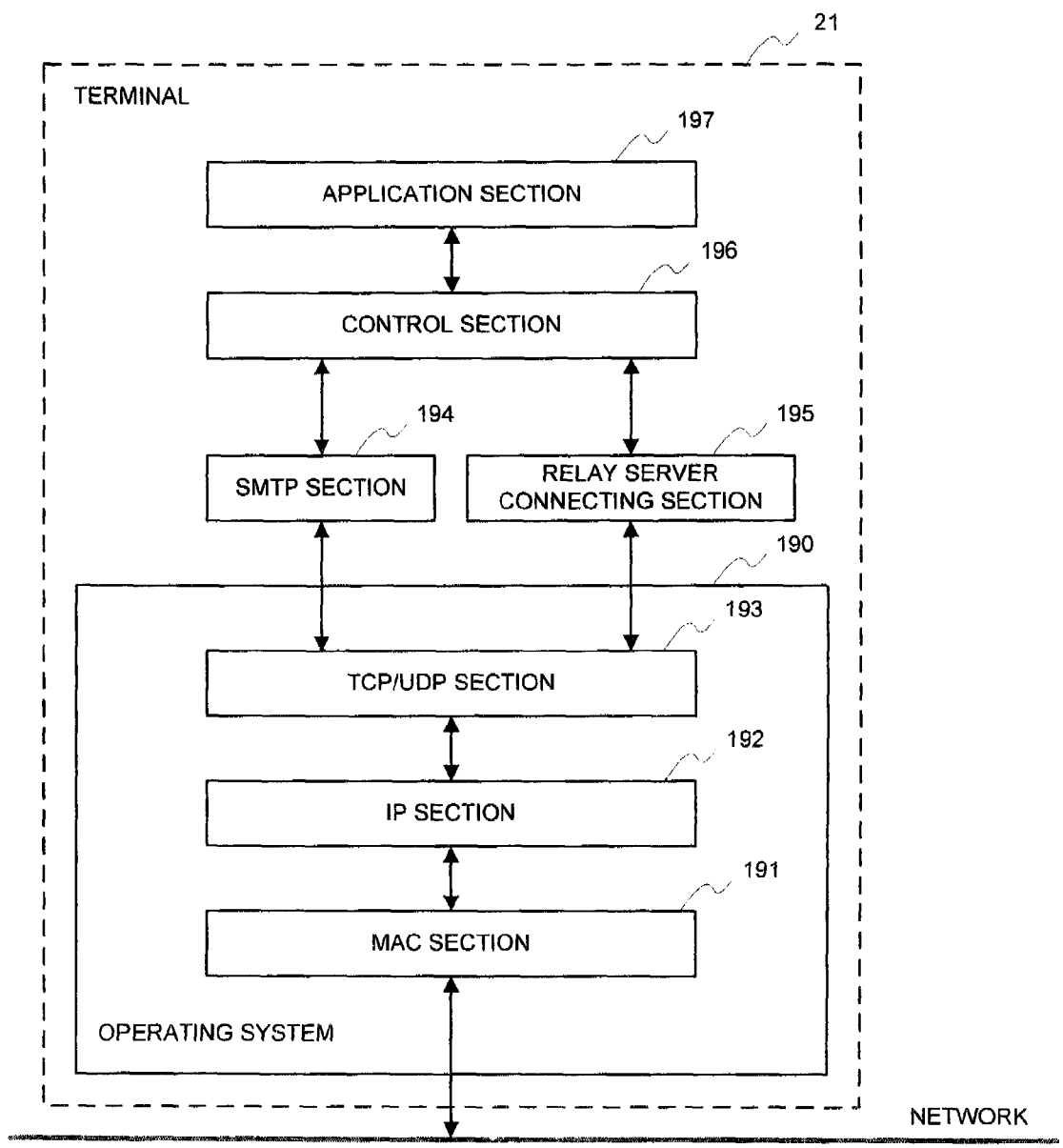
FIG. 20 is a configuration diagram of the terminal 21 in a fourth embodiment of the present application.

FIG. 20 shows the internal configuration of the terminal 21. In addition to the processing of the control section 36 in FIG. 4, the control section 196 in the terminal 21 has a function of negotiating a method of encryption/decryption processing for packets, and performs encryption of packets to be transmitted and decryption of received packets.

Figure 21:
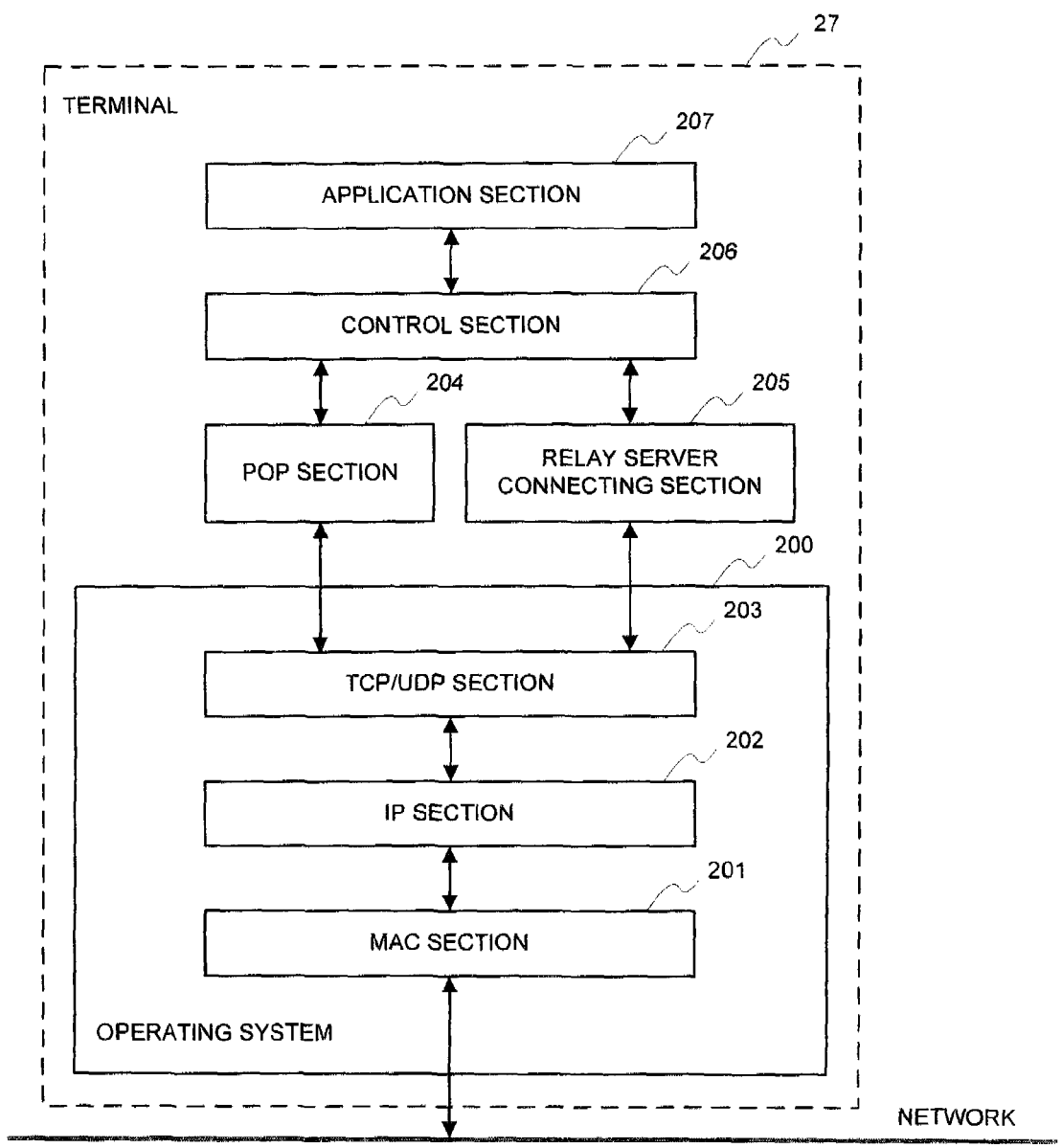
FIG. 21 is a configuration diagram of the terminal 27 in the fourth embodiment of the present application.

FIG. 21 shows the internal configuration of the terminal 27. In addition to the processing of the control section 46 in FIG. 5, the control section 206 in the terminal 27 has a function of negotiating a method of encryption/decryption processing for packets, and performs encryption of packets to be transmitted and decryption of received packets.

Since other components are similar to those shown in the drawings for the first embodiment, description thereof will be omitted.

Next, the operation of the fourth embodiment of the present application will be described in detail with reference to FIG. 22.

Figure 22:
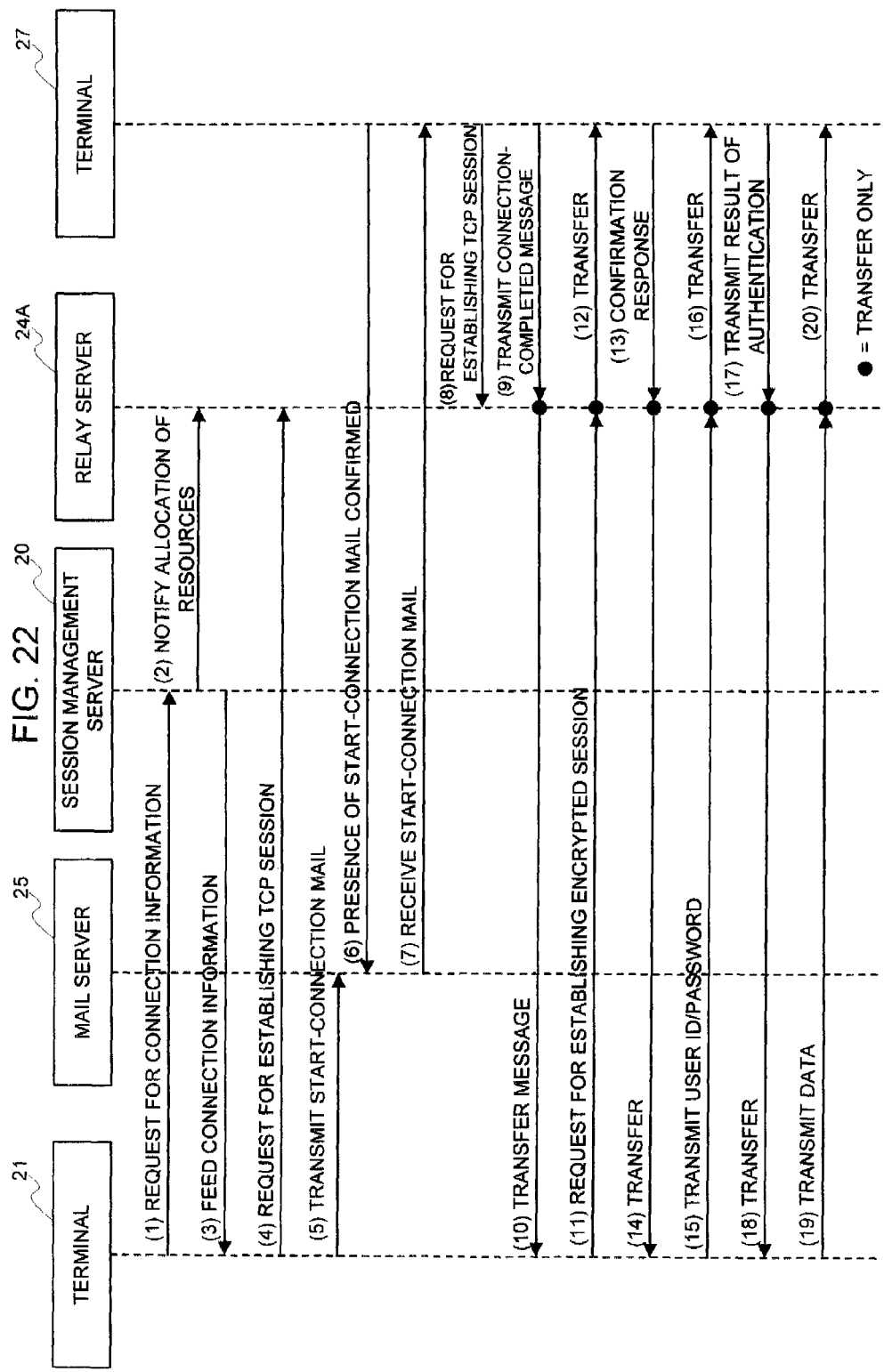
FIG. 22 is a diagram for explaining a connecting operation in the fourth embodiment of the present application.

FIG. 22 is a flow chart showing processing for starting packet communication between the terminals 21, 27. The details thereof will now be described.

<Start Packet Communication>

Since the procedure to start packet communication is similar in partway to that at Steps 1-10 in the first embodiment of the present application, description thereof will be omitted.

(Step 11)

Upon completion of connection processing with the terminal 27 via the relay server 24A, the control section 196 in the terminal 21 exchanges information required in encryption/decryption of packets with the terminal 27. First, the control section 196 in the terminal 21 transmits a public key A, which is a counterpart of a secret key A owner by the terminal 21 itself, to the terminal 27.

(Step 12)

The relay server 24A transfers the public key A, which is received from the terminal 21, to the terminal 27.

(Step 13)

The control section 206 in the terminal 27 receives the public key A from the relay server 24A. The control section 206 in the terminal 27 transmits a public key B, which is a counterpart of a secret key B owner by the terminal 27 itself, to the terminal 21.

(Step 14)

The relay server 24A transfers the public key B, which is received from the terminal 27, to the terminal 21.

(Step 15)

The control section 196 in the terminal 21 receives the public key B from the relay server 24A. In the processing thereafter, the terminal 21 encrypts packets to be transmitted using the public key B and decrypts received packets using the secret key A. Such an encryption method is known as a public-key cryptographic scheme. The control section 196 in the terminal 21 first encrypts the user ID and password using the public key B, and then transmits them to the terminal 27.

(Step 16)

The relay server 24A transfers the encrypted packet, which is received from the terminal 21, to the terminal 27.

(Step 17)

On receipt of the encrypted packet, the control section 206 in the terminal 27 decrypts it using the secret key B, and then makes a check as to whether the user ID and password are legitimated. If the user ID or password is improper, the terminal 27 disconnects the TCP session connected with the relay server 24A. If the user ID and password are correct, the control section 206 in the terminal 27 encrypts an authentication-succeeded message using the public key A, and then transmits it to the terminal 21.

(Step 18)

The relay server 24A transfers the encrypted packet, which is received from the terminal 27, to the terminal 21.

(Step 19)

On receipt of the encrypted packet, the control section 196 in the terminal 21 decrypts it using the secret key A, and then obtains the authentication-succeeded message. Thereafter, packets are encrypted/decrypted using the secret/public keys as described above, and are exchanged between the terminals 21, 27.

Packet communication is thus started between the terminals 21, 27.

It should be noted here that processing for encryption and decryption is executed at an application level in the terminals 21, 27, and the relay server 24A merely executes transfer processing as in the first embodiment. Since no load associated with encryption is thus imposed on the relay server 24A, a system having high scalability as well as high security level is achieved.

The flow chart provided above adopts the method of connection in accordance with the first embodiment, so that a start-connection mail must be transmitted once. However, the flow chart is provided merely by way of example, and the method of connection in accordance with any one of the second-fourth embodiments may be employed to reduce the number of mail transmissions.

<Terminate Packet Communication>

Since the procedure for terminating packet communication is similar to that at Steps 1-4 in the first embodiment of the present application, description thereof will be omitted.

Packet communication between the terminals 21, 27 is thus terminated.

Now an exemplary effect of the fourth embodiment of the present application will be described.

According to the fourth embodiment of the present application, by encrypting the user ID and password using encryption information, the information is prevented from being intercepted by malicious third parties on the Internet. This eliminates the risk that the terminal 21 or relay server 24 is hacked by malicious third parties. For this reason, the object of the present application is attained.

Next, a fifth embodiment of the present application will be described in detail with reference to the accompanying drawings.

According to a fifth embodiment of the present application, a connection request mail is transmitted from an auxiliary terminal 29 operated by a user to the terminal 21, whereby connection/disconnection processing between the terminals 21, 27 can be remotely operated. This enables packet communication between the terminals 21, 27 to be quickly started without the user going to a location where a direct operation of the terminal 21 is allowed.

The configuration of the present embodiment will now be described.

Figure 23:
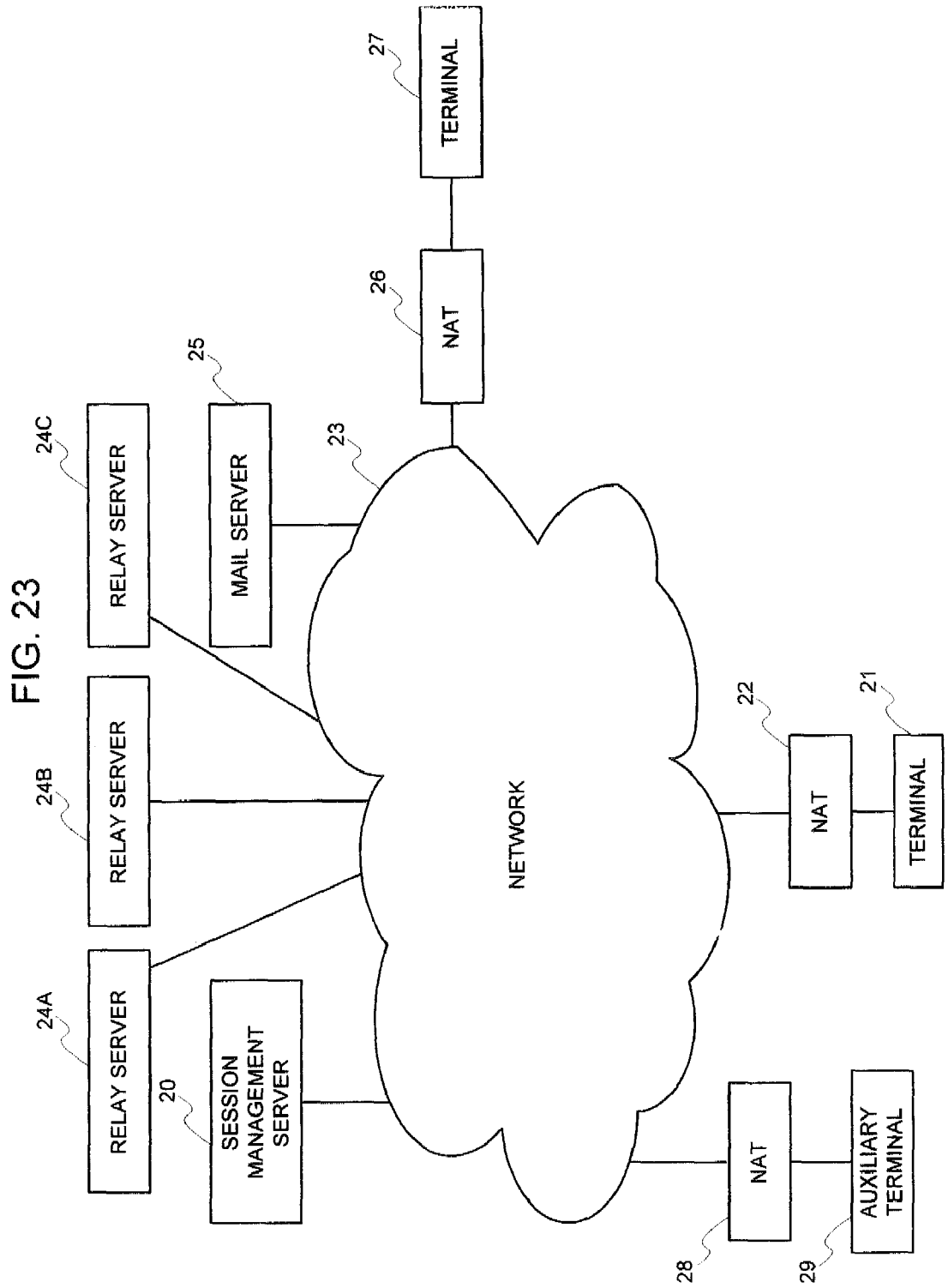
FIG. 23 is a configuration diagram of a fifth embodiment of the present application.

Referring to FIG. 23, the fifth embodiment of the present application comprises an auxiliary terminal 29 and a NAT 28, in addition to the components shown in FIG. 3.

Moreover, according to the fifth embodiment of the present application, to solve the aforementioned problem, the internal configuration of the terminal 21 is modified.

Figure 24:
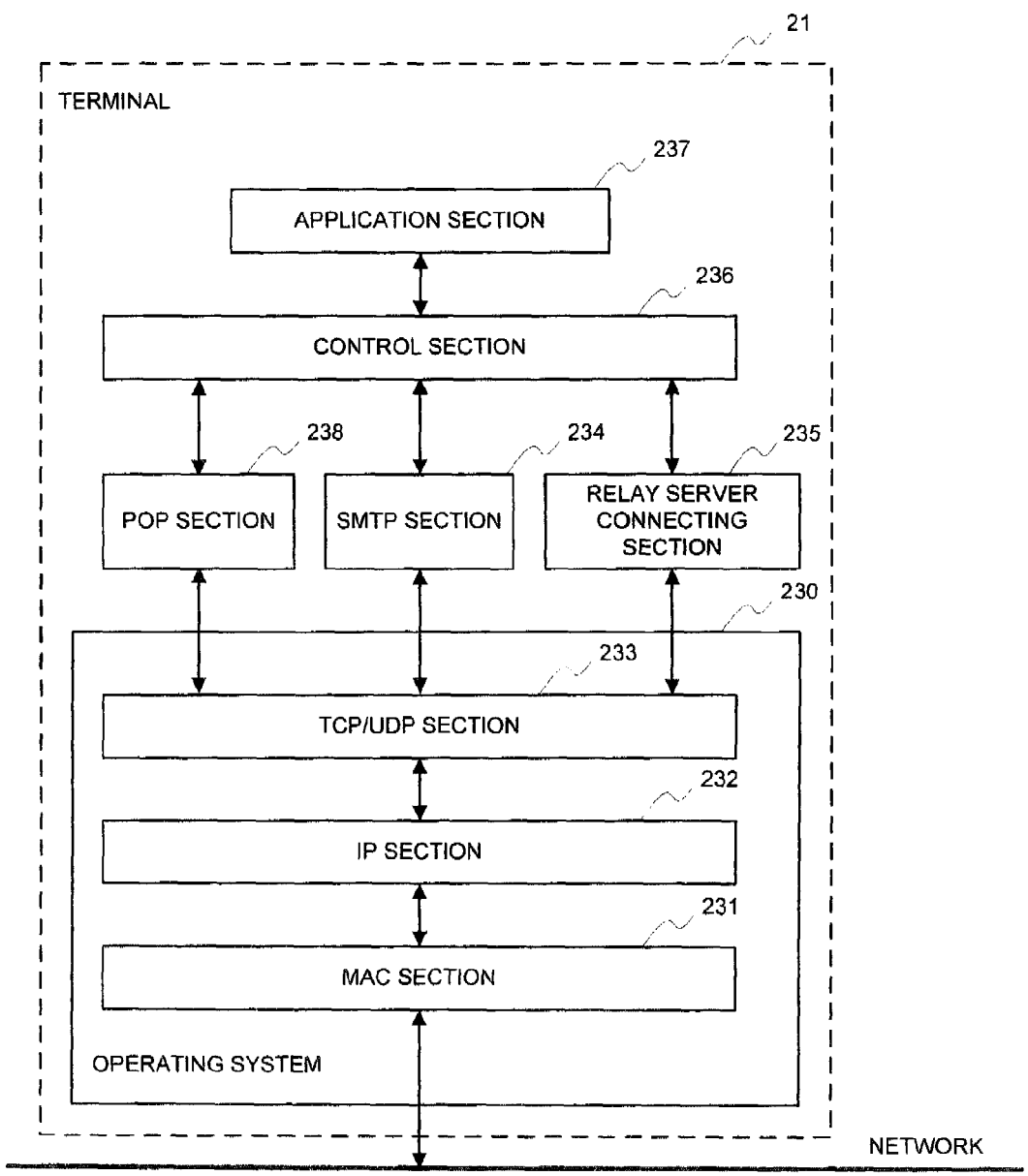
FIG. 24 is a configuration diagram of the terminal 21 in the fifth embodiment of the present application.

The internal configuration of the terminal 21 is shown in FIG. 24.

Since the difference in the internal configuration of the terminal 21 from that shown in FIG. 4 is only in a control section 236 and a POP section 238, description of other components will be omitted.

The POP section 238 is a standard protocol processing section for reception of electronic mails.

To periodically make a check as to whether a connection request mail has arrived at the mail server 25, the control section 236 calls a function in the POP section 238; if a connection request mail has arrived, the control section 236 analyzes contents of the mail. Thereafter, it calls a function in the server connecting section 235 to connect to the session management server 20. Other processing is similar to that in the first embodiment.

Figure 25:
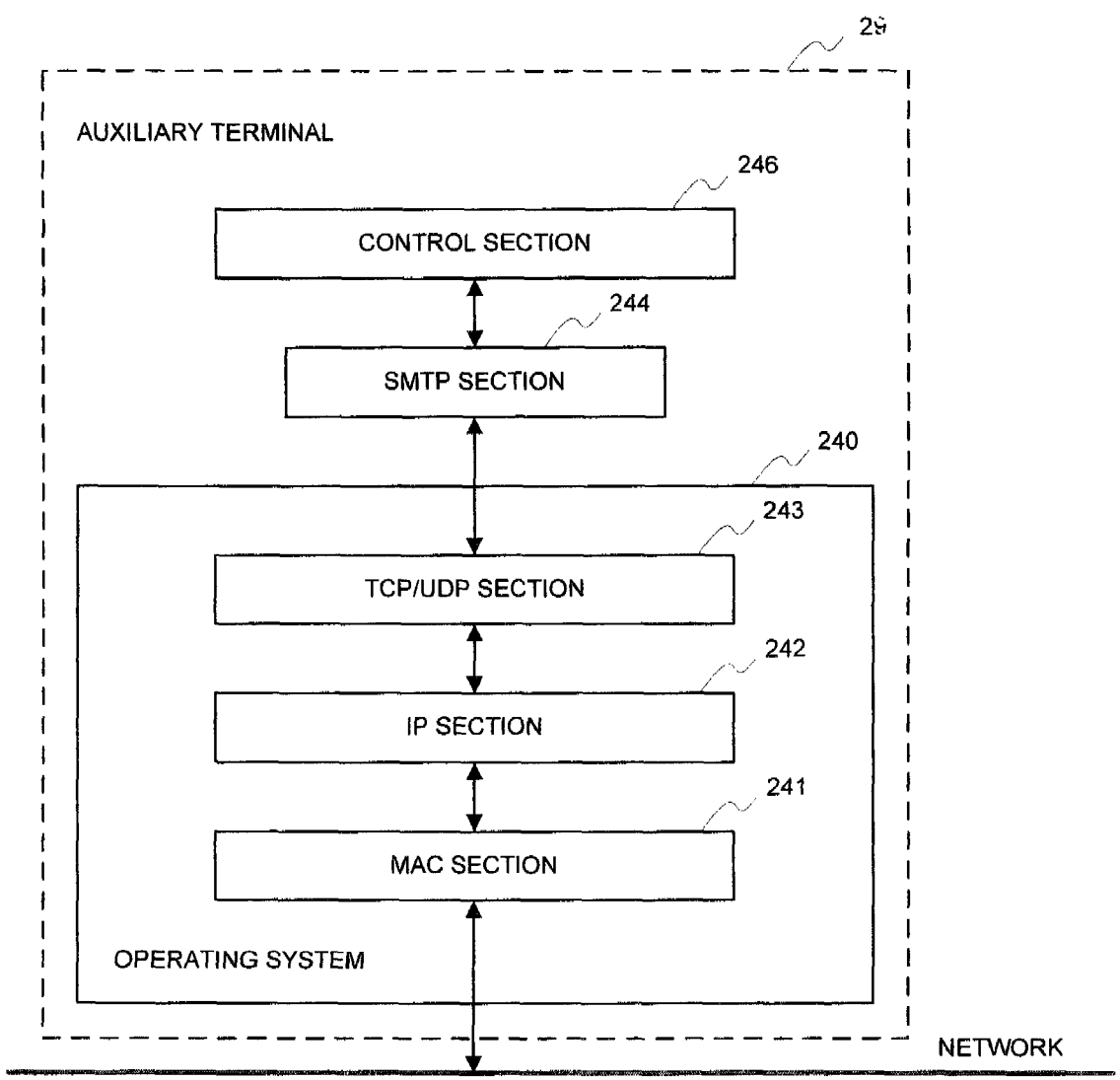
FIG. 25 is a configuration diagram of an auxiliary terminal in the fifth embodiment of the present application.

The internal configuration of the auxiliary terminal 29 is shown in FIG. 25.

As shown in FIG. 25, the auxiliary terminal 29 comprises a control section 246, an SMTP section 244, and an operating system 240. The operating system 240 comprises a TCP/UDP section 243, an IP section 232, and a MAC section 241.

The MAC section 241 is a standard protocol processing section for transmission/reception of Ethernet packets. Upstream of the MAC section 241, the IP section 242 and TCP/UDP section 243, which are standard protocol processing sections for the Internet, are operated.

Upstream of the TCP/UDP section 243, the SMTP section 244, which is a standard protocol processing sections for transmission of electronic mails, is operated.

Upstream of the SMTP section 244, the control section 246 is operated to call a function in the SMTP section 244 for transmitting a connection request mail and a disconnection request mail.

Next, the operation of the present embodiment will be described.

Figure 26:
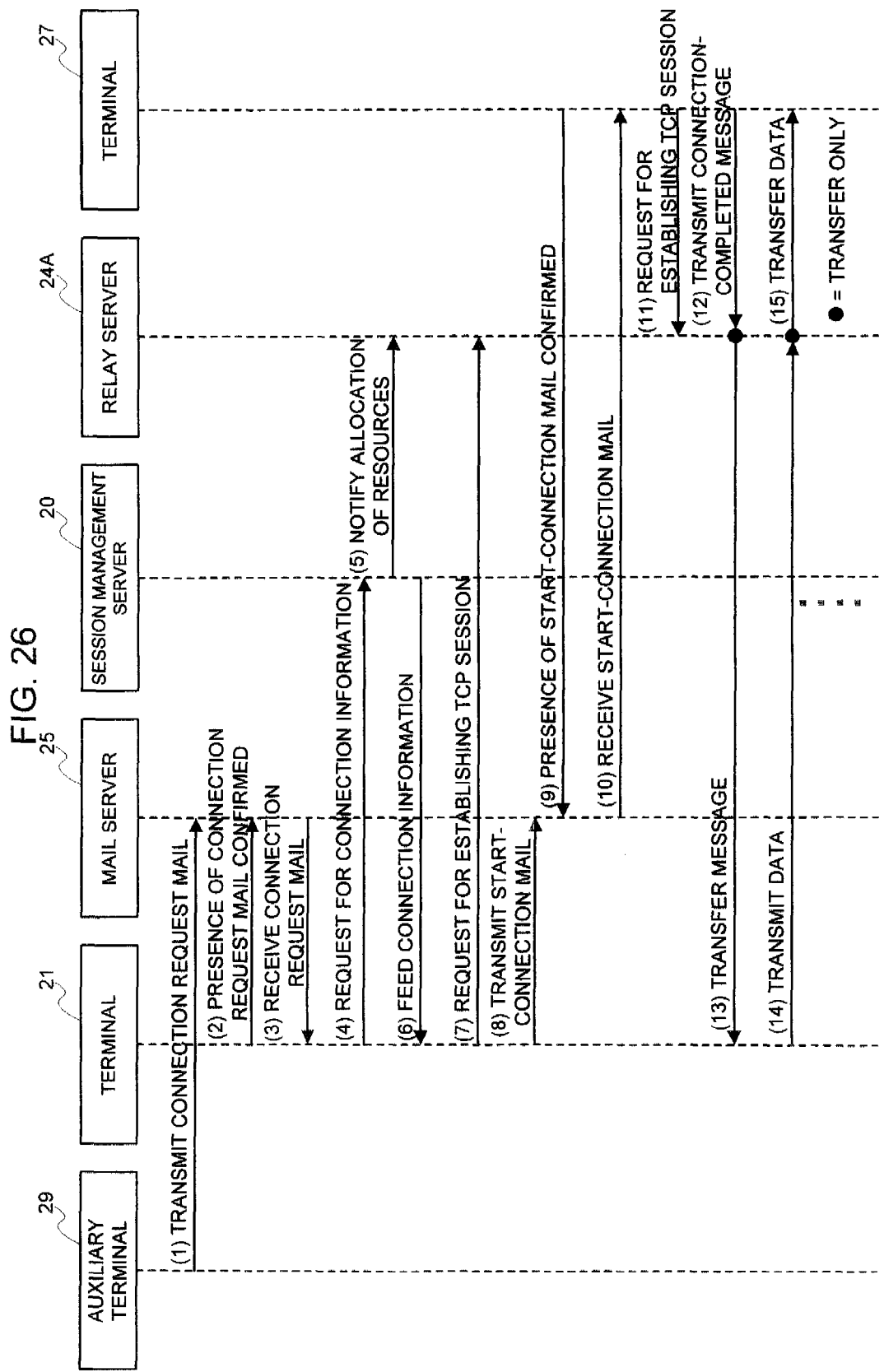
FIG. 26 is a diagram for explaining a connecting operation in the fifth embodiment of the present application.
Figure 27:
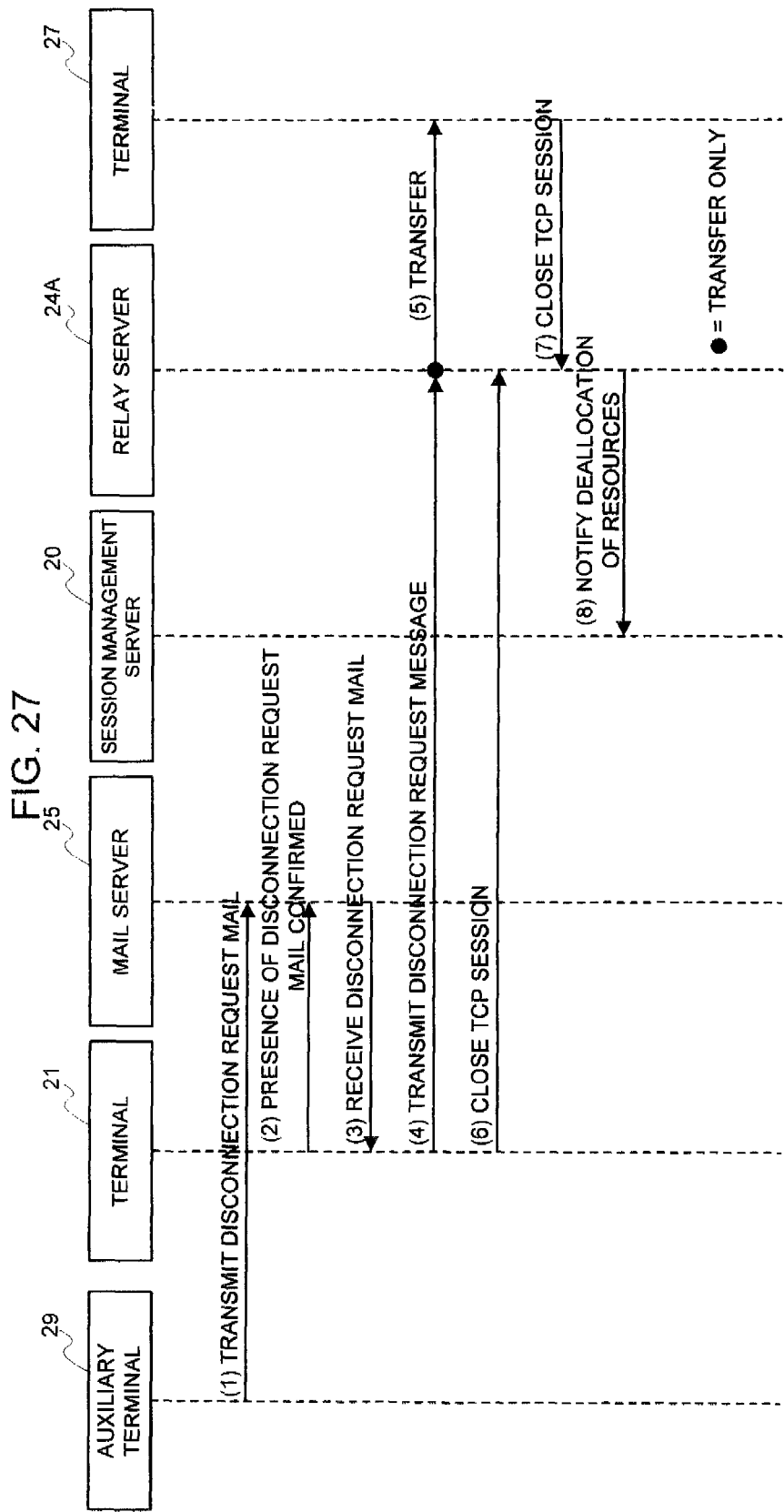
FIG. 27 is a diagram for explaining a disconnecting operation in the fifth embodiment of the present application.

FIG. 26 is a flow chart showing processing for starting packet communication between the terminals 21, 27, details of which will be described below.

<Start Packet Communication>

(Step 1)

When a user operating the auxiliary terminal 29 desires to connect the terminal 21 with the terminal 27, the user directs the SMTP section 244 via the control section 246 in the auxiliary terminal 29 to transmit a connection request mail destined for the terminal 21. The connection request mail transmitted here may have its subject specified as "Connection Request Mail," for example, so as to allow discrimination from other electronic mails.

(Step 2)

The control section 236 in the terminal 21 has directed the POP section 238 to periodically (e.g., every thirty seconds) check the mail server 25 as to whether a connection request mail has arrived. Arrival of a connection request mail is judged by the presence of an electronic mail with its subject specified as "Connection Request Mail." Moreover, arrival of a connection request mail may be judged based on, in addition to the subject, whether the sender mail address matches a prespecified mail address, or whether descriptions in the body of the electronic mail match prespecified ones.

(Step 3)

Once the control section 236 in the terminal 21 has confirmed that a connection request mail is present on the mail server 25, it directs the POP section 238 to receive the connection request mail and delete the mail from the mail server 25.

(Step 4)

On receipt of the connection request mail, the control section 236 in the terminal 21 directs the server communicating section 235 to connect to the session management server 20. Following the direction, the server communicating section 235 in the terminal 21 establishes a session with the session managing section 64 in the session management server 20.

Since the procedure thereafter is similar to that at Steps 2-11 of the operation for starting packet communication in the first embodiment of the present application, description thereof will be omitted.

Packet communication between the terminals 21, 27 is thus remotely started from the auxiliary terminal 29.

It should be noted here that the flow chart in FIG. 26 adopts the method of connection in accordance with the first embodiment as a method of connection between the terminals 21, 27; however, the flow chart is provided merely by way of example, and the method of connection in accordance with any one of the second-fifth embodiments may be employed as the method of connection.

Moreover, according to the aforementioned flow chart, a connection request mail is transmitted from the auxiliary terminal 29 to thereby notify the terminal 21 of the fact that connection processing between the terminals 21, 27 is to be remotely operated; however, it should be understood that the flow chart is provided merely by way of example. For example, the method of notification of the remote operation may be achieved by transmitting a connection request message to the terminal 21 via a TCP session referring to the third embodiment, rather than transmitting a mail.

<Terminate Packet Communication>

(Step 1)

When a user operating the auxiliary terminal 29 desires to disconnect a session between the terminals 21, 27, the user directs the SMTP section 244 via the control section 246 in the auxiliary terminal 29 to transmit a disconnection request mail destined for the terminal 21. The disconnection request mail transmitted here may have its subject specified as "Disconnection Request Mail," for example, so as to allow discrimination from other electronic mails.

(Step 2)

The control section 236 in the terminal 21 has directed the POP section 238 to periodically (e.g., every thirty seconds) check the mail server as to whether a disconnection request mail has arrived. Arrival of a disconnection request mail is judged by the presence of an electronic mail with its subject specified as "Disconnection Request Mail." Moreover, arrival of a disconnection request mail may be judged based on, in addition to the subject, whether the sender mail address matches a prespecified mail address, or whether descriptions in the body of the electronic mail match prespecified ones.

(Step 3)

Once the control section 236 in the terminal 21 has confirmed that a disconnection request mail is present on the mail server 25, it directs the POP section 238 to receive the disconnection request mail and delete the mail from the mail server 25.

Since the procedure thereafter is similar to that at Steps 1-4 of the operation for terminating packet communication in the first embodiment of the present application, description thereof will be omitted.

Packet communication between the terminals 21, 27 is thus remotely terminated from the auxiliary terminal 29.

According to the aforementioned flow chart, a disconnection request mail is transmitted from the auxiliary terminal 29 to thereby notify the terminal 21 of the fact that disconnection processing between the terminals 21, 27 is to be remotely operated; however, it should be understood that the flow chart is provided merely by way of example. For example, the method of notification of the remote operation may be achieved by transmitting a disconnection request message to the terminal 21 via a TCP session referring to the third embodiment, rather than transmitting a mail.

Next, an exemplary effect of the fifth embodiment of the present application will be described.

According to the fifth embodiment of the present application, a connection request mail is transmitted from the auxiliary terminal 29, whereby connection/disconnection processing between the terminals 21, 27 to be remotely operated without a user going to a location where a direct operation of the terminal 21 is allowed, thus enabling quick start of packet communication. For this reason, the object of the present application is attained.

Next, a sixth embodiment of the present application will be described in detail with reference to the accompanying drawings.

According to the sixth embodiment of the present application, the session management server 20 is given virtual IP address and port, and the terminal 21 is caused to connect to the virtual IP address and port. The session management server 20 transfers packets received from the terminal 21 or 27 to a relay server having a low processing load taking account of the load conditions among the relay servers 24. This allows the terminal 21 to know only the virtual IP address and port of the session management server 20, and a need to reconnect to the relay server 24 is eliminated. Thus, the connection processing at the terminal 21 is simplified, and packet communication can be quickly achieved even if the terminal 21 uses an access line having a narrow bandwidth as in PHS.

The configuration of the present embodiment will be described.

Figure 28:
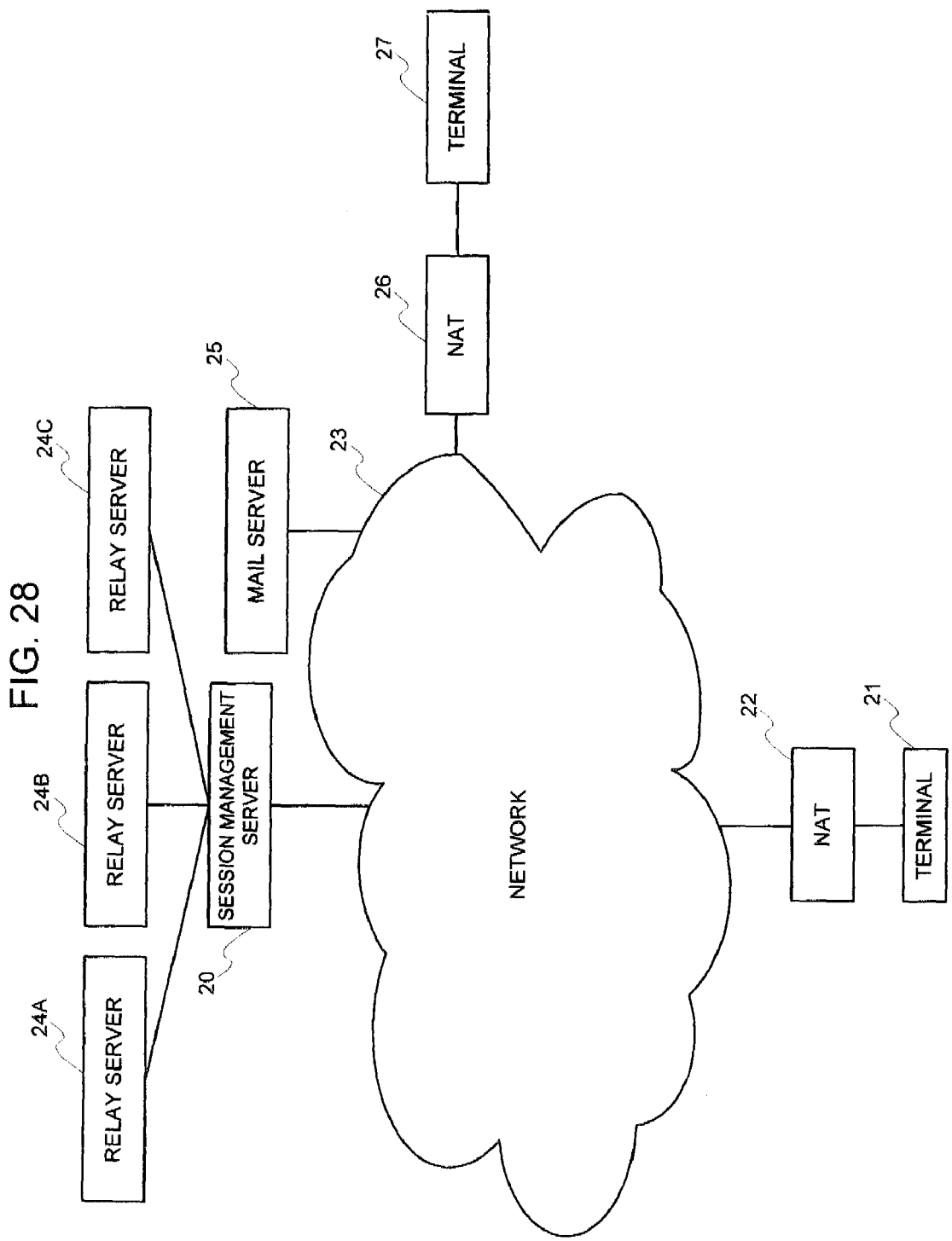
FIG. 28 is a configuration diagram of a sixth embodiment of the present application.

Referring to FIG. 28, the sixth embodiment of the present application is different from the configuration shown in FIG. 3 in that the relay servers 24 are connected to the network 23 via the session management server 20.

Moreover, according to the sixth embodiment of the present application, to solve the aforementioned problems, the internal configuration of the session management server 20 is modified.

Figure 29:
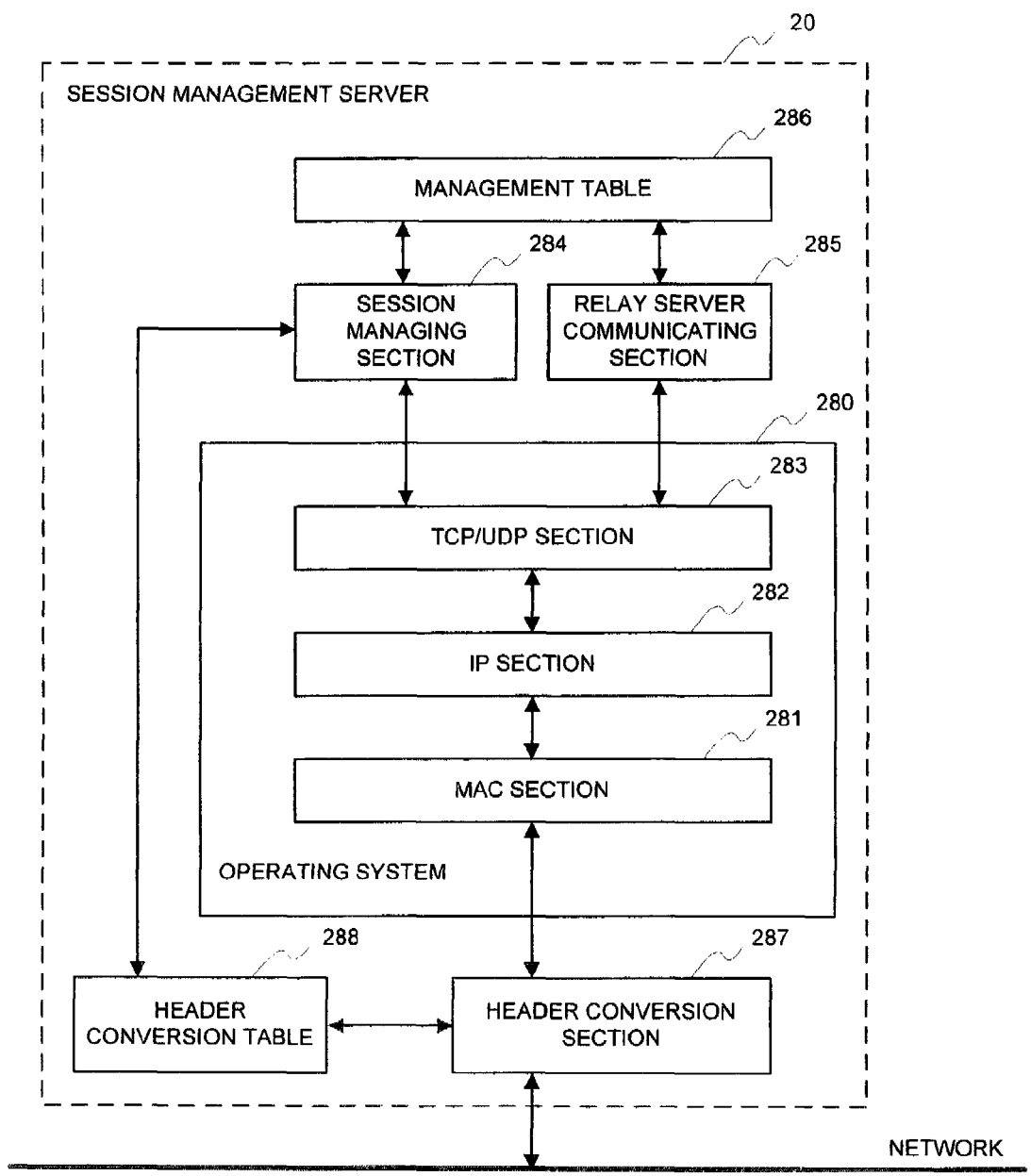
FIG. 29 is a configuration diagram of the session management server in the sixth embodiment of the present application.

The internal configuration of the session management server 20 is shown in FIG. 29.

Since the difference in the internal configuration of the session management server 20 from that shown in FIG. 8 is modification on the session managing section 284 and the contents in the management table 286, and addition of a header conversion section 287 and a header conversion table 288. Since other components are similar to those shown in FIG. 8, description thereof will be omitted.

The session managing section 284 waits for a connection from the terminals 21, 27, and if it is connected with the terminals 21, 27, it transfers the connection to a relay server having a low processing load.

The management table 286 has the number of current relayed-transfer processing and their identification numbers registered for each relay server as shown in FIG. 30. A relay server having a low processing load can be identified from the management table 286, and an identification number by which a certain terminal is identifiable can be put out.

The header conversion section 287 converts the IP/TCP header in a packet and sends the packet out to the network to achieve seamless transfer of packets sent from the terminals and relay servers.

Figure 32:
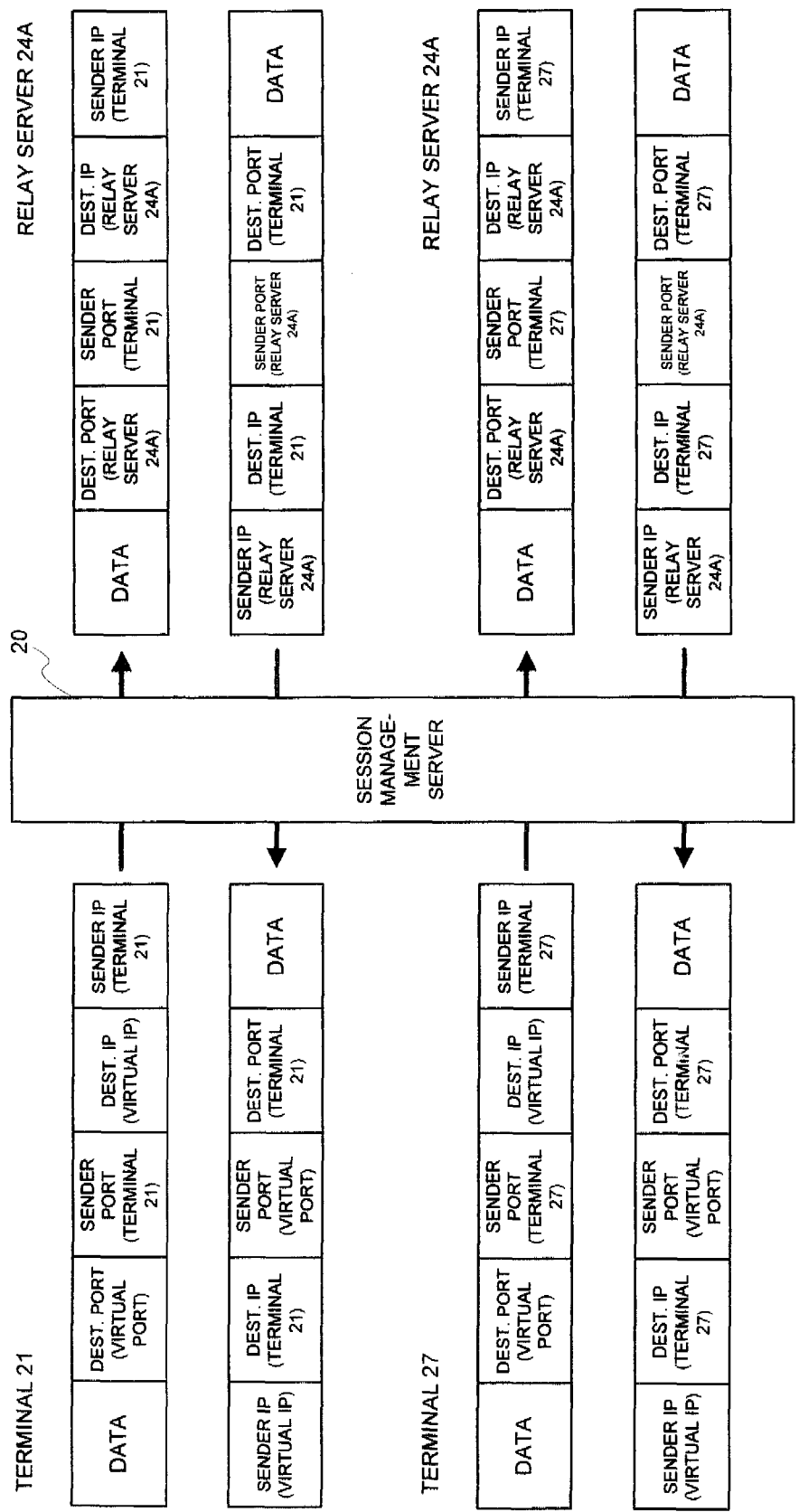
FIG. 32 is a diagram for explaining header conversion.

The header conversion table 288 has correspondence in header conversion between a terminal and a relay server registered as shown in FIG. 31. The header conversion section 287 checks the header conversion table 288 to know to which relay server a packet received from a terminal is to be transferred, and to which terminal a packet received from a relay server is to be transferred. FIG. 32 shows the aspect of the header conversion.

Next, the operation of the present embodiment will be described.

FIG. 33 is a flow chart showing processing for starting packet communication between the terminals 21, 27, details of which will be described below.

\<Start Packet Communication\>

(Step 1)

When the terminal 21 desires to start packet communication with the terminal 27, the control section 36 in the terminal 21 first directs the server communicating section 35 to connect to the session management server 20. Following the direction, the server communicating section 35 in the terminal 21 transmits a request for establishing a session to the session managing section 284 in the session management server 20. The destination IP address and destination port number of the request packet is assumed to be set as a virtual IP address and a virtual port number.

(Step 2)

The session managing section 284 in the session management server 20 checks the management table 286 to identify a relay server having a small number of current relayed-transfer processing, i.e., a relay server having a low processing load. The following description will be made assuming that the relay server 24A is selected. The session management server 20 first transmits a resource-allocated message containing an identification number to delegate relay processing to the relay server 24A having a low processing load. The identification number is selected from among those in an unused state in the management table 286. In an explanation below, assuming that A1 is selected as the identification number, the explanation will be provided. On receipt of the resource-allocated message, the relay server 24A registers the identification number (A1) into the relay table 56 for use in relaying/transferring sessions from terminals.

(Step 3)

The session managing section 284 in the session management server 20 transfers the request for establishing a session, which is received from the terminal 21, to the relay server 24A. The relay server 24A registers the connection information into the relay table 56 to link the terminal 21 with the received identification number. Moreover, since the session managing section 284 in the session management server 20 is thus determined to transfer the terminal 21 to the relay server 24A, it registers such a correspondence into the header conversion table 288 and directs the header conversion section 287 to transfer packets, which will be sent from the terminal 21 thereafter, as is at the header conversion section 287.

(Step 4)

The session managing section 284 in the session management server 20 notifies the terminal 21 of the selected identification number (A1).

(Step 5)

The control section 36 in the terminal 21 directs the SMTP section 34 to transmit a start-connection mail, which is destined for the terminal 27, to the mail server 25. The start-connection mail transmitted here may have its subject specified as "Connection Start Mail," for example, so as to allow discrimination from other electronic mails. Moreover, in the body of the start-connection mail, the identification number (A1) is written.

(Step 6)

The control section 46 in the terminal 27 has directed the POP section 44 to periodically (e.g., every thirty seconds) check the mail server 25 as to whether a start-connection mail has arrived. Arrival of a start-connection mail is judged by the presence of an electronic mail with its subject specified as "Connection Start Mail." Moreover, arrival of a start-connection mail may be judged based on, in addition to the subject, whether the sender mail address matches a prespecified mail address, or whether descriptions in the body of the electronic mail match prespecified ones.

(Step 7)

Once the control section 46 in the terminal 27 has confirmed that a start-connection mail is present on the mail server 25, it directs the POP section 44 to receive the start-connection mail and delete the mail from the mail server 25.

(Step 8)

On receipt of the start-connection mail, the control section 46 in the terminal 27 transmits a request for establishing a session to the session managing section 284 in the session management server 20. It is assumed here that the destination IP address and destination port number for the request packet is set as the virtual IP address and virtual port number, respectively, and the identification number (A1) written in the start-connection mail is written in the body.

(Step 9)

On receipt of a packet of a request for establishing a session having the identification number (A1), the session managing section 284 in the session management server 20 can know that the packet should be transferred to the relay server 24A by looking up the management table 286. Accordingly, it transfers the packet of a request for establishing a session to the relay server 24A. Since the session managing section 284 in the session management server 20 is thus determined to transfer the terminal 27 to the relay server 24A, it registers such a correspondence into the header conversion table 288 and directs the header conversion section 287 to transfer packets, which will be sent from the terminal 27 thereafter, as is at the header conversion section 287. Moreover, on receipt of the packet of a request for establishing a session, the relay-transfer section 54 in the relay server 24A registers connection information into the relay table 56 based on the identification number (A1) and starts relay-transfer processing between the terminals 21, 27 having the matched identification number (A1). Representing the TCP session with the terminal 21 as TCP session A and that with the terminal 27 as TCP session B, the relay server 24A transfers the data received from the TCP session A to the TCP session B, and the data received from the TCP session B to the TCP session A.

(Step 10)

Once the control section 46 in the terminal 27 has established a session with the relay server 24A, it transmits a connection-completed message to the session management server 20.

(Step 11)

On receipt of the connection-completed message, the header conversion section 287 in the session management server 20 converts the destination IP address and destination port number by looking up the header conversion table 288, and then transmits them to the relay server 24A.

(Step 12)

On receipt of the connection-completed message from the terminal 27, the relay-transfer section 54 in the relay server 24A transmits the message to the terminal 21 by looking up the relay table.

(Step 13)

On receipt of the connection-completed message, the header conversion section 287 in the session management server 20 converts the sender IP address and sender port number by looking up the header conversion table 288, and then transmits the message to the terminal 21.

(Step 14)

On receipt of the connection-completed message, the control section 36 in the terminal 21 starts packet communication with the terminal 27. At that time, the control section 36 passes data from the application section 37 to the server communicating section 35, and transmits it to the session management server 20 via the TCP session A.

(Step 15)

The header conversion section 287 in the session management server 20 transfers the packet to the relay server 24A by looking up the header conversion table 288.

(Step 16)

The relay-transfer section 54 in the relay server 24A transfers the data, which is sent by the terminal 21, to the terminal 27 via the session management server 20.

(Step 17)

On receipt of the packet, the header conversion section 287 in the session management server 20 converts the sender IP address and sender port number because the header conversion information for the packet is registered in the header conversion table 288, and then transmits the packet to the terminal 27. Packets can thus be transmitted from the terminal 21 to the terminal 27 via the relay server 24A as described above. Moreover, although the procedure at Steps 7-8 is described with reference to a case in which data is transmitted from the terminal 21 to the terminal 27, it is obvious that the data may be transmitted from the terminal 27 to the terminal 21 in a similar way.

Packet communication is thus started between the terminals 21, 27.

Next, processing to terminate the aforementioned packet communication will be described hereinbelow. FIG. 34 is a flow chart showing processing to terminate packet communication between the terminals 21, 27, details of which will be described below.

<Terminate Packet Communication>

(Step 1)

When the terminal 21 desires to terminate packet communication with the terminal 27, the control section 36 in the terminal 21 first transmits a disconnection request message for terminating data communication to the terminal 27 via the session management server 20 and relay server 24A.

(Step 2)

After transmitting the disconnection request message, the control section 36 in the terminal 21 directs the server communicating section 35 to disconnect the TCP session with the relay server 24A. This request for disconnecting a TCP session is delivered to the relay server 24A via the session management server. The TCP session between the terminal 21 and relay server 24A is thus disconnected.

(Step 3)

In a similar way, on receipt of the aforementioned disconnection request message, the control section 46 in the terminal 27 directs the server communicating section 45 to disconnect the TCP session with the relay server 24A. This request for disconnecting a TCP session is delivered to the relay server 24A via the session management server. The TCP session between the terminal 27 and relay server 24A is thus disconnected. On the other hand, once the TCP sessions from the terminals 21, 27 have been disconnected, the relay server A terminates the relay processing between the terminals.

(Step 4)

After the relay processing between the terminals 21, 27 has been terminated, the relay server 24A deletes the entry for the identification number (A1) in the relay table 56 to erase the corresponding information therefrom. Moreover, it transmits a resource-deallocated message containing the identification number (A1) to the session management server 20 to notify it of the fact that the processing load is reduced. On receipt of the resource-deallocated message, the session management server 20 increases the number of relay-connections of the relay server 24A in the management table 66, and adds A1 to the field of the identification number in an unused state. Moreover, it directs the header conversion section 287 to delete the information corresponding to the identification number (A1) from the header conversion table 288 and terminate header conversion for their packets.

Packet communication between the terminals 21, 27 is thus terminated.

Now an exemplary effect of the sixth embodiment of the present application will be described.

According to the sixth embodiment of the present application, the session management server 20 is given virtual IP address and port, and it transmits packets received from the terminal 21 or 27 to a relay server having a low processing load taking account of the load conditions among the relay servers 24. This allows the terminal 21 to know only the virtual IP address and port of the session management server 20, and a need to reconnect to the relay server 24 is eliminated, thus enabling quick start of packet communication. For this reason, the object of the present application is attained.

It should be noted that although the aforementioned apparatuses in the present application may be implemented in hardware as is obvious from the preceding description, it is also possible to implement them using a computer program. In this case, a processor running according to programs stored in a program memory realizes the functions and operations similar to those described regarding the aforementioned embodiments.

While the present application has been particularly shown and described with reference to exemplary embodiments thereof, the present application is not limited to these embodiments. It will be understood by those of ordinary skill in the art that various changes in form and details may be made therein without departing from the spirit and scope of the present application as defined by the claims.

According to the present application described above, the number of mail transmissions/receptions required to start packet communication can be reduced, thus enabling quick start of packet communication.

Moreover, according to the present application, by distributing packet relay processing among relay servers by the session management server taking account of the load conditions among them, concentration of the processing load on a specific relay server can be prevented to improve the response speed of the relay servers, thus enabling quick start of packet communication.

Moreover, according to the present application, information such as a user ID or a password is prevented from being intercepted by malicious third parties on the Internet, thus eliminating the risk of hacking.

Furthermore, according to the present application, connection processing can be started without a user going to a location where a direct operation of the terminal 21 is allowed, thus enabling quick start of packet communication.

In addition, according to the present application, since a terminal can merely perform connection processing involving transmitting a packet of a request for establishing a session to a session management server, and a need to perform connection processing to two servers, i.e., a session management server and a relay server, is eliminated, the connection processing at the terminal is simplified. Thus, packet communication can be quickly started even if the terminal uses a low-speed access line as in PHS.

What is claimed is:

1. A communication system comprising:
   a first terminal connected to a second terminal over a network;
   a relay server connected to the first terminal and the second terminal over the network that establishes a first session with the first terminal and a second session with the second terminal; and
   a session management server connected to the first terminal, the second terminal, and the relay server over the network, the session management server including a session management table that stores, for each of a plurality of relay servers including the relay server, a number of sessions between each of the plurality of relay servers and terminals connected to the plurality of relay servers;
   wherein the first terminal comprises:
      a communication section that transmits a request to the session management server, the request requesting the session management server to assign the first terminal a relay server among the plurality of relay servers to which the first terminal can establish a session, and receives a response from the session management server, in response to the request, the response including at least one of an IP address and a port number of an assigned relay server among the plurality of relay servers: and
      a start-connection message transmitter that transmits a start-connection message to said second terminal after said first terminal has established a session with said assigned relay server, the start-connection message including at least one of an IP address and a port number of the assigned relay server,
   wherein the second terminal comprises:
      a connection-completed message transmitter that transmits a connection-completed message to said assigned relay server after said second terminal has established a session with said assigned relay server based on the at least one of the IP address and the port number of said assigned relay server in the start-connection message,
   wherein the session management server determines that the relay server is a relay server among the plurality of relay servers having a fewest number of sessions in response to the request from the first terminal based on the session management table, designates the relay server as the assigned relay server, and transmits the response including at least one of an IP address and a port number of the relay server as the at least one of the IP address and the port number of the assigned relay server to the first terminal, and
   wherein said relay server transfers said connection-completed message to said first terminal, and relays communication between said first terminal and said second terminal.

2. The communication system according to claim 1, wherein the session management server searches the session management table for relay server among the plurality of relay servers having the fewest number of sessions.

3. The communication system according to claim 2, wherein said start-connection message transmitter transmits the start-connection message destined for said second terminal via said session management server.

4. The communication system according to claim 2, wherein said relay server transfers data from said first terminal to said second terminal via the session management server, and transfers data from said second terminal to said first terminal via the session management server.

5. The communication system according to claim 1, wherein said relay server establishes said session with said first terminal connected therewith based on a command from an auxiliary terminal.

6. The communication system according to claim 1, wherein said start-connection message transmitter transmits the start-connection message destined for said second terminal using an electronic mail via a mail server.

7. The communication system according to claim 1, wherein said first terminal and said second terminal transmit and receive encrypted data.

8. The communication system according to claim 7, wherein said first terminal and said second terminal execute said encryption at a transport layer or higher.

9. The communication system according to claim 1, wherein said first terminal transmits a disconnection request message to said second terminal using the session established between itself and said relay server and the session established between said relay server and said second terminal, to disconnect each session established with said relay server.

10. The communication system according to claim 1, wherein, when the session with said first terminal is disconnected, said relay server transmits a disconnection request message to said second terminal using the session established with said second terminal.

11. The communication system according to claim 1, wherein said relay server disconnects each session established with said first terminal and said second terminal when the session established with said first terminal or said second terminal is in a communication-less state for a certain period of time.

12. A communication method comprising:
   transmitting, by a first terminal, a request to a session management server, the request requesting the session management server to assign the first terminal a relay server to which the first terminal can establish a session;
   determining, by a session management server, a relay server among a plurality of relay servers, to which the first terminal can establish a session, having a fewest number of sessions among the plurality of relay servers, in response to the request from the first terminal based on a session management table that stores, for each of the plurality of relay servers, a number of sessions between each of the plurality of relay servers and terminals connected to the plurality of relay servers;
   transmitting, by the session management server, a response including at least one of an IP address and a port number of the relay server;
   receiving, by the first terminal, the response from the session management server, in response to the request;
   a first establishing step of establishing a session between a first terminal and the relay server, based on the at least one of the IP address and the port number of the relay server in the response;
   a start-connection message transmitting step of, after the session has been established between said first terminal and said relay server, transmitting a start-connection message from the first terminal to a second terminal, the start-connection message including the at least one of an IP address and the port number of the relay server;
   a second establishing step of establishing a session between said second terminal and said relay server based on the at least one of the IP address and the port number of said assigned relay server in the start-connection message;

a connection-completed message transmitting step of transmitting a connection-completed message from the second terminal to said relay server after said second terminal has established the session with said relay server;

a connection-completed message transferring step of transferring, by the relay server, said connection-completed message to said first terminal; and a data transferring step of, after said connection-completed message has been transferred, transferring data between said first terminal and said second terminal.

13. The communication method according to claim 12, the session management server searches the session management table for relay server among the plurality of relay servers having the fewest number of sessions.

14. The communication method according to claim 12, wherein said first establishing step includes a step of establishing a session between said first terminal connected therewith based on a command from an auxiliary terminal, and said relay server.

15. The communication method according to claim 12, wherein said start-connection message transmitting step includes a step of transmitting the start-connection message destined for said second terminal using an electronic mail via a mail server.

16. The communication method according to claim 12, wherein said start-connection message transmitting step includes a step of transmitting the start-connection message destined for said second terminal via the session management server.

17. The communication method according to claim 12, wherein said data transferring step includes a step of transferring data from said first terminal to said second terminal via the session management server, and transferring data from said second terminal to said first terminal via the session management server.

18. The communication method according to claim 12, wherein said communication method has an encrypting step of encrypting said data.

19. The communication method according to claim 18, wherein said encrypting step includes a step of encrypting said data at a transport layer or higher.

20. The communication method according to claim 12, wherein said method has:
- a disconnection-request-message transmitting step of transmitting a disconnection request message from said first terminal to said second terminal using the session established between said first terminal and said relay server and the session established between said relay server and second terminal;
- a first disconnecting step of, after said disconnection request message has been transmitted, disconnecting the session established between said first terminal and said relay server; and
- a second disconnecting step of disconnecting the session established between said relay server and said second terminal based on said disconnection request message.

21. The communication method according to claim 12, wherein said method has a disconnection-request-message transmitting step of, when the session established between said relay server and said first terminal is disconnected, transmitting the disconnection request message to said second terminal using the session established between said relay server and said second terminal.

22. The communication method according to claim 12, wherein said method has a disconnecting step of disconnecting the session established between said relay server and said first terminal or the session established between said relay server and said second terminal when the session established between said relay server and said first terminal or between said relay server and second terminal is in a communicationless state for a certain period of time.

23. A communication system in which a first terminal and a second terminal connected to a network communicate with each other over the network via a relay server, comprising:
- the first terminal;
- the second terminal; and
- a session management server including a session management table that stores, for each of a plurality of relay servers including the relay server, a number of sessions between each of the plurality of relay servers and terminals connected to the plurality of relay servers, wherein the first terminal transmits a request to the session management server, the request requesting the session management server to assign the first terminal a relay server among the plurality of relay servers to which the first terminal can establish a session, receives a response from the session management server, in response to the request, the response including at least one of an IP address and a port number of an assigned relay server among the plurality of relay servers, transmits a start-connection message to the second terminal after said first terminal has established a session with the assigned relay server, the start-connection message including at least one of an IP address and a port number of the assigned relay server wherein the second terminal transmits a connection-completed message to said assigned relay server after said second terminal has established a session with said assigned relay server based on the at least one of the IP address and the port number of said assigned relay server in the start-connection message, and wherein the session management server determines that the relay server is a relay server among the plurality of relay servers having a fewest number of sessions in response to the request from the first terminal based on the session management table, designates the relay server as the assigned relay server, and transmits the response including at least one of an IP address and a port number of the relay server as the at least one of the IP address and the port number of the assigned relay server to the first terminal.

24. The communication system according to claim 23, wherein the session management server searches the session management table for relay server among the plurality of relay servers having the fewest number of sessions.

25. The communication system according to claim 23, wherein said system has an auxiliary terminal for transmitting to said terminal a command message for commanding it to transmit a start-connection message to said session management server.

26. A terminal that communicates via a relay server, comprising:
- a transceiving section that transmits a request to a session management server, the request requesting the session management server to assign the terminal a relay server to which the terminal can establish a session, receives a response from the session management server, in response to the request, the response including at least one of an IP address and a port number of a relay server selected by the session management server from among a plurality of relay servers as a relay server assigned to establish a session with the terminal and having a fewest number of sessions between terminals among the plurality of relay servers based on a session management table in the session management server that stores, for each of the plurality of relay servers including the relay server, a number of sessions between each of the plurality of relay servers and terminals connected to the plurality of relay servers, and transmits a start-connection message to a second terminal after the terminal has established a session with the assigned relay server, the start-connection message including at least one of an IP address and a port number of the assigned relay server; and a communicating section that communicates, after receiving a connection-completed message, which indicates that the second terminal has established a session with the relay server, from the second terminal in response to said start-connection message, with the second terminal through the relay server.

27. A communication method in which a first terminal and a second terminal connected to a network communicate with each other over the network via a relay server, comprising:

transmitting, by the first terminal, a request to the session management server, the request requesting the session management server to assign the first terminal a relay server to which the first terminal can establish a session;

receiving, by the first terminal, a response from the session management server, in response to the request, the response indicating that the relay server is selected by the session management server from among a plurality of relay servers as a relay server assigned to establish a session with the first terminal and having a fewest number of sessions between terminals based on a session management table in the session management server that stores, for each of the plurality of relay servers including the relay server, a number of sessions between each of the plurality of relay servers and terminals connected to the plurality of relay servers;

a start-connection message transmitting step of transmitting, by the first terminal, a start-connection message to the second terminal after said first terminal has established a session with the assigned relay server, the start-connection message including at least one of an IP address and a port number of the assigned relay server;

a receiving step of receiving, by the first terminal, a connection-completed message from the second terminal that indicates the second terminal has established a session with the assigned relay server, in response to said start-connection message; and a communicating step of communicating between the first terminal and the second terminal through the assigned relay server.

28. The communication method according to claim 27, wherein the session management server searches the session management table for relay server among the plurality of relay servers having the fewest number of sessions.

29. The communication method according to claim 27, wherein said method has a step of transmitting a command message to said terminal for commanding it to transmit a start-connection message.

30. A non-transitory storage medium that stores a computer-executable program, said program causing said computer to function as:

a transceiving section that transmits a request to a session management server, the request requesting the session management server to assign the terminal a relay server to which the terminal can establish a session, receives a response from the session management server, in response to the request, the response including at least one of an IP address and a port number of a relay server selected by the session management server from among a plurality of relay servers as a relay server assigned to establish a session with the terminal and having a fewest number of sessions between terminals among the plurality of relay servers based on a session management table in the session management server that stores, for each of the plurality of relay servers including the relay server, a number of sessions between each of the plurality of relax: servers and terminals connected to the plurality of relay servers, and transmits a start-connection message to a second terminal after the terminal has established a session with the assigned relay server, the start-connection message including at least one of an IP address and a port number of the assigned relay server; and a communicating section that communicates, after receiving a connection-completed message, which indicates that the second terminal has established a session with the relay server, from the second terminal in response to said start-connection message, with the second terminal through the relay server.

* * * * *

UNITED STATES PATENT AND TRADEMARK OFFICE
CERTIFICATE OF CORRECTION

| | | |
|---|---|---|
| PATENT NO. | : 7,831,715 B2 | Page 1 of 1 |
| APPLICATION NO. | : 11/766170 | |
| DATED | : November 9, 2010 | |
| INVENTOR(S) | : Hideo Yoshimi et al. | |

It is certified that error appears in the above-identified patent and that said Letters Patent is hereby corrected as shown below:

Column 27, Line 27: In Claim 1, delete "servers:" and insert -- servers; --

Column 32, Line 32: In Claim 30, delete "relax:" and insert -- relay --

Signed and Sealed this
Third Day of May, 2011

David J. Kappos
*Director of the United States Patent and Trademark Office*